(12) United States Patent
Gunnarsson et al.

(10) Patent No.: US 12,386,076 B2
(45) Date of Patent: Aug. 12, 2025

(54) OBTAINING AND PROVIDING POSITIONING ASSISTANCE DATA

(71) Applicant: Telefonaktiebolaget LM Ericsson (publ), Stockholm (SE)

(72) Inventors: Fredrik Gunnarsson, Linköping (SE); Ritesh Shreevastav, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 446 days.

(21) Appl. No.: 17/440,761

(22) PCT Filed: Mar. 17, 2020

(86) PCT No.: PCT/SE2020/050272
§ 371 (c)(1),
(2) Date: Sep. 18, 2021

(87) PCT Pub. No.: WO2020/190198
PCT Pub. Date: Sep. 24, 2020

(65) Prior Publication Data
US 2022/0179097 A1    Jun. 9, 2022

Related U.S. Application Data

(60) Provisional application No. 62/820,291, filed on Mar. 19, 2019.

(51) Int. Cl.
*G01S 19/25* (2010.01)
*G01S 19/04* (2010.01)
*G01S 19/06* (2010.01)

(52) U.S. Cl.
CPC ............ *G01S 19/252* (2013.01); *G01S 19/04* (2013.01); *G01S 19/06* (2013.01)

(58) Field of Classification Search
CPC ........ G01S 19/252; G01S 19/04; G01S 19/06; H04W 64/00
See application file for complete search history.

(56) References Cited

U.S. PATENT DOCUMENTS 7,495,608 B1 * 2/2009 Chen ...................... G01S 19/06
342/357.43
2011/0039576 A1    2/2011 Prakash et al.
(Continued)

FOREIGN PATENT DOCUMENTS

WO    2018/203820 A1    11/2018

OTHER PUBLICATIONS

International Search Report and Written Opinion of the International Searching Authority, PCT/SE2020/050272, mailed May 19, 2020, 18 pages.
(Continued)

*Primary Examiner* — Mazda Sabouri
(74) *Attorney, Agent, or Firm* — Weisberg I.P. Law, P.A.

(57) ABSTRACT

A method performed by a target device to obtain positioning assistance data from a location server is provided. The target device and the location server are operating in a wireless communications network. The target device transmits a request to the location server. The request is a request for positioning assistance data and provides first logical position information. The target device obtains positioning assistance data from the location server. The positioning assistance data is based on the first logical position information. When being associated with a second logical position, the target device transmits a request to the location server. The request requests for positioning assistance data and provides second logical position information. The target device obtains posi-
(Continued)

Method performed by target device 210 tioning assistance data from the location server. The positioning assistance data is based on the second logical position information.

8 Claims, 24 Drawing Sheets

(56) References Cited

U.S. PATENT DOCUMENTS

| | | |
|---|---|---|
| 2012/0196615 A1* | 8/2012 | Edge ................. H04W 4/029 |
| | | 455/456.1 |
| 2014/0113608 A1 | 4/2014 | Wirola et al. |
| 2014/0274110 A1 | 9/2014 | Mehta et al. |
| 2017/0034221 A1 | 2/2017 | Wirola et al. |
| 2017/0279899 A1 | 9/2017 | Jain et al. |
| 2019/0007787 A1* | 1/2019 | Gao ................. G01S 5/0205 |
| 2022/0326338 A1* | 10/2022 | Ali-Tolppa .............. H04W 4/20 |

OTHER PUBLICATIONS

3rd Generation Partnership Project; Technical Specification Group Radio Access Network; Evolved Universal Terrestrial Radio Access (E-UTRA); LTE Positioning Protocol (LPP) (Release 15) 3GPP TS 36.355 V15.1.0 (Sep. 2018) 217 pages.
EPO Communication dated Oct. 6, 2023 for Patent Application No. 20714008.8, consisting of 9-pages.
Chinese Office Action with English language machine translation dated Jun. 27, 2024 for Patent Application No. 202080016501.2, consisting of 19 pages.

* cited by examiner

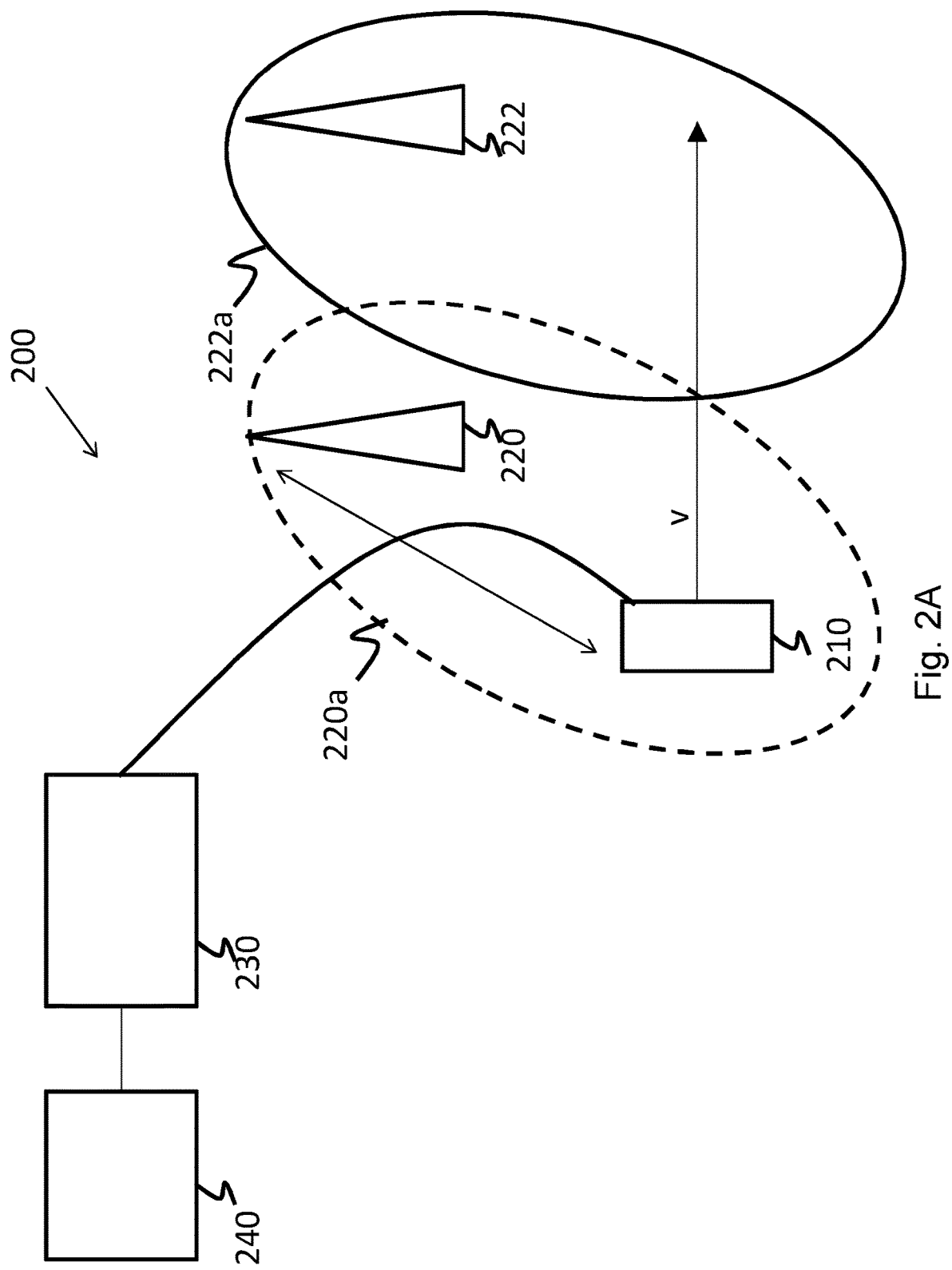

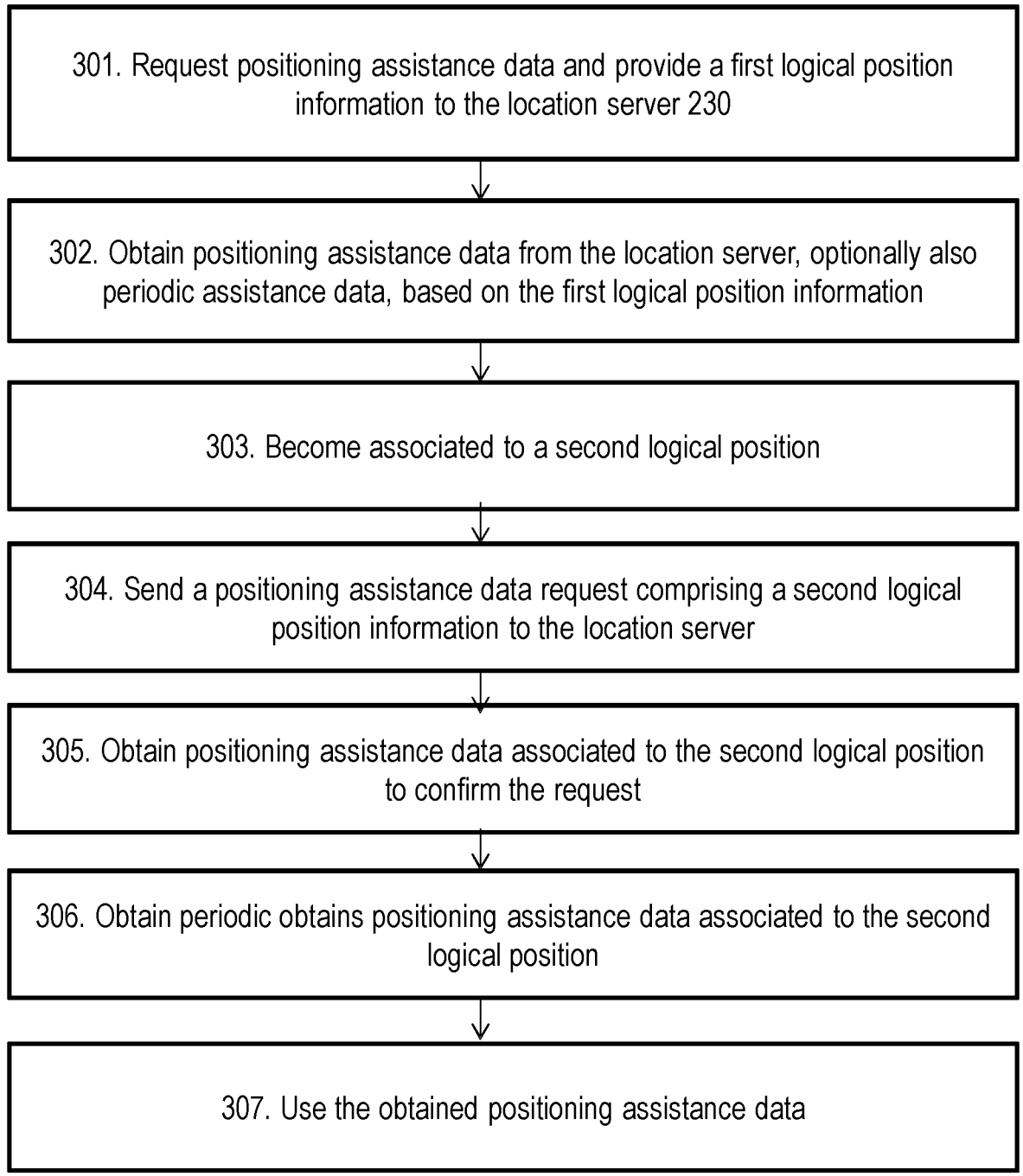
Fig. 3A Method performed by target device 210

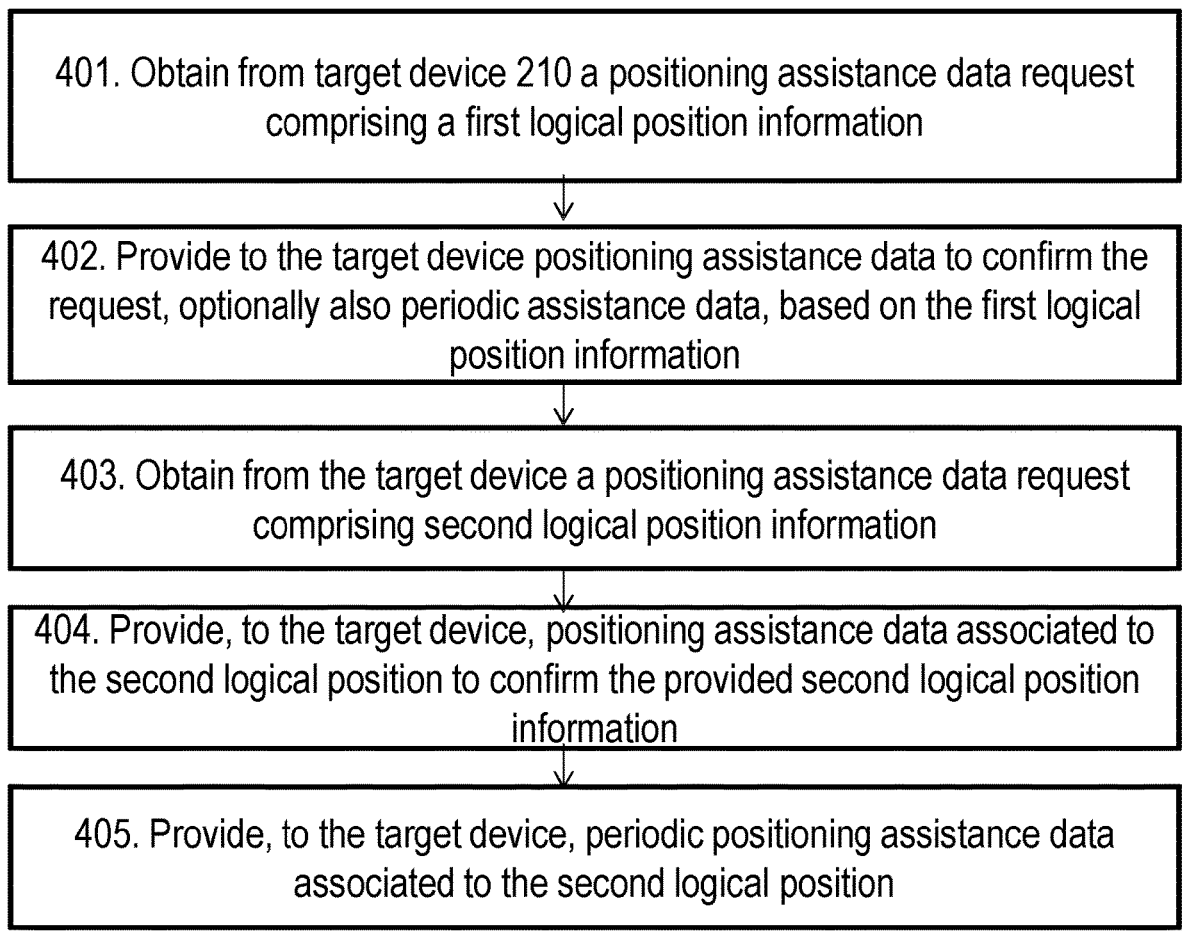
Fig. 4A Method performed by location server 230

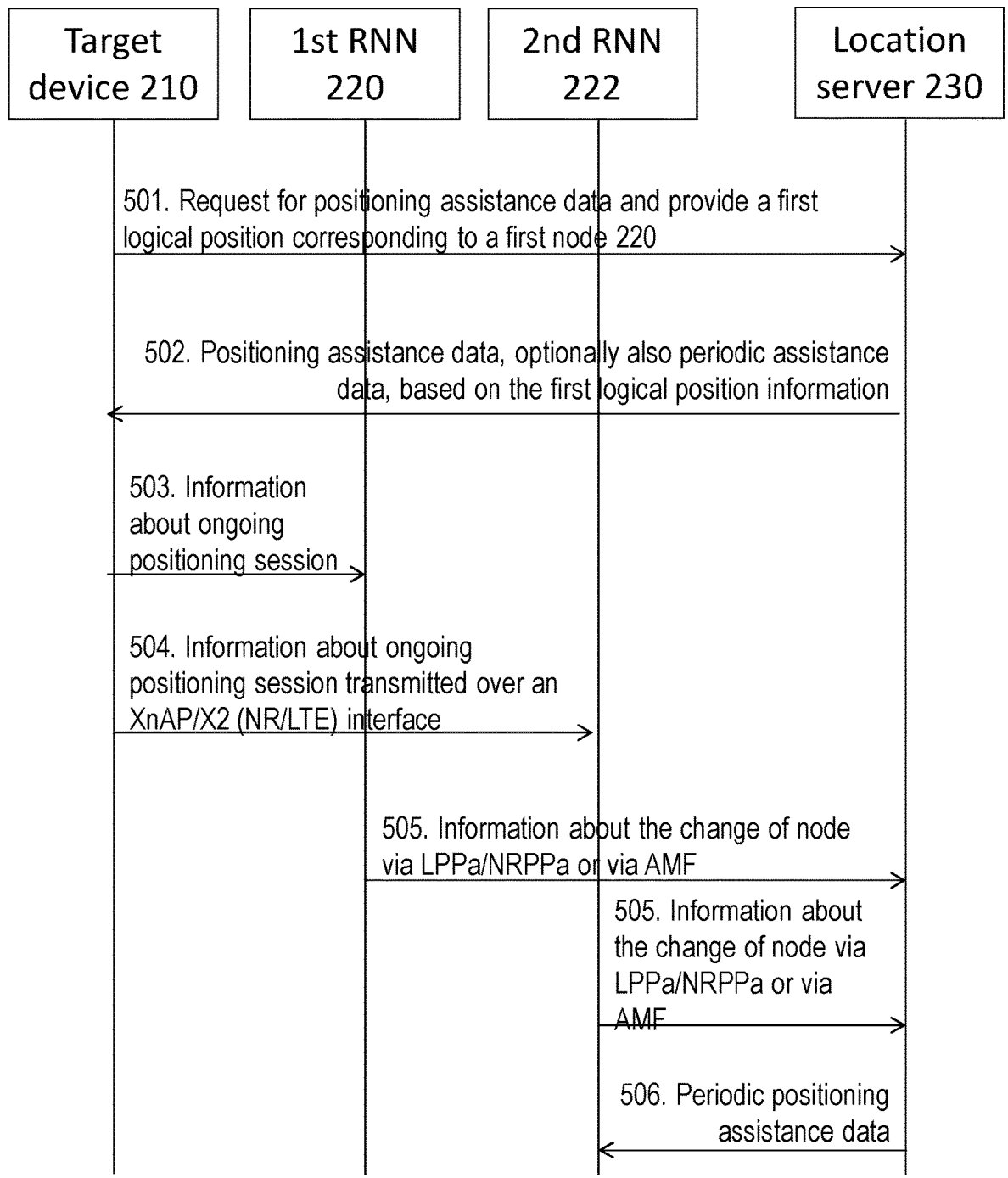
Fig. 5 exemplifying signalling at session handover

| assistanceDataElement |
|---|
| GNSS-ReferenceTime |
| GNSS-ReferenceLocation |
| GNSS-IonosphericModel |
| GNSS-EarthOrientationParameters |
| GNSS-RTK-ReferenceStationInfo |
| GNSS-RTK-CommonObservationInfo |
| GNSS-RTK-AuxiliaryStationData |
| GNSS-TimeModelList |
| GNSS-DifferentialCorrections |
| GNSS-NavigationModel |
| GNSS-RealTimeIntegrity |
| GNSS-DataBitAssistance |
| GNSS-AcquisitionAssistance |
| GNSS-Almanac |
| GNSS-UTC-Model |
| GNSS-AuxiliaryInformation |
| BDS-DifferentialCorrections |
| BDS-GridModelParameter |
| GNSS-RTK-Observations |
| GLO-RTK-BiasInformation |
| GNSS-RTK-MAC-CorrectionDifferences |
| GNSS-RTK-Residuals |
| GNSS-RTK-FKP-Gradients |
| GNSS-SSR-OrbitCorrections |
| GNSS-SSR-ClockCorrections |
| GNSS-SSR-CodeBias |

Fig. 11

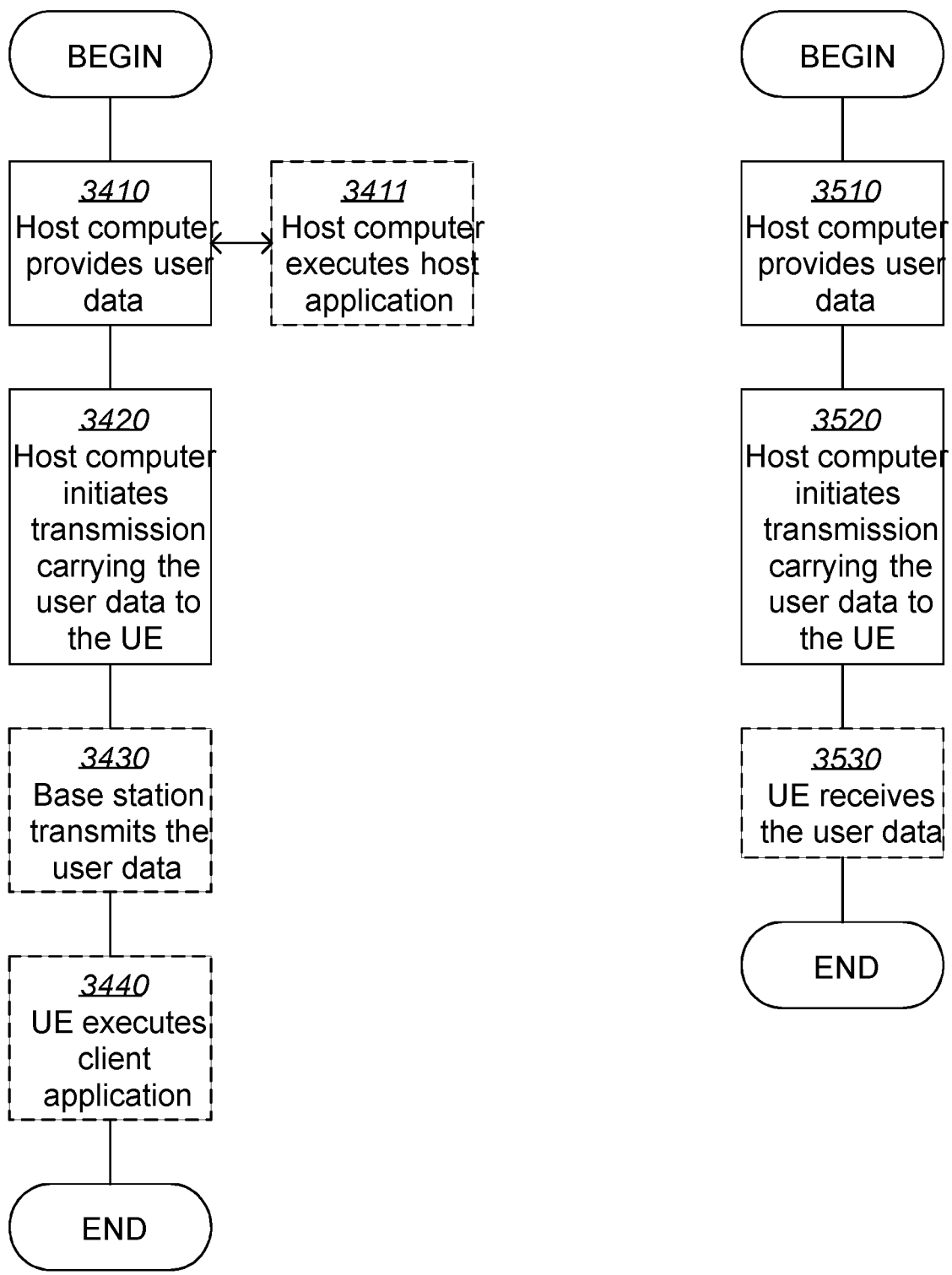

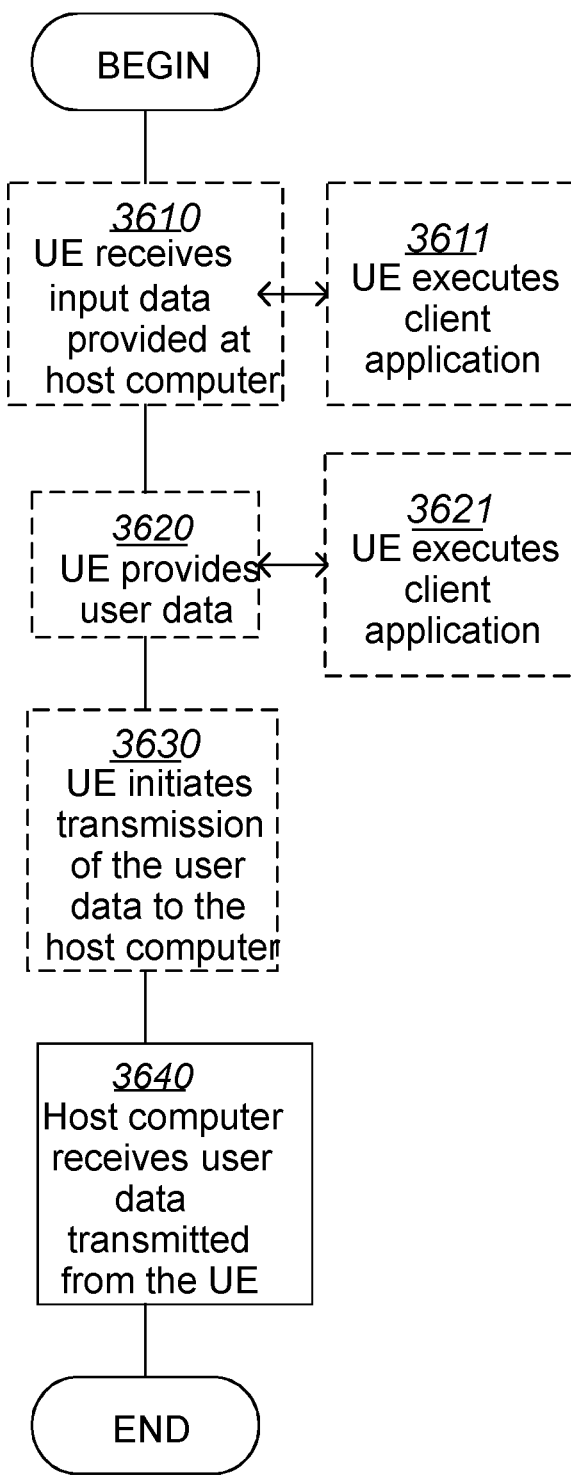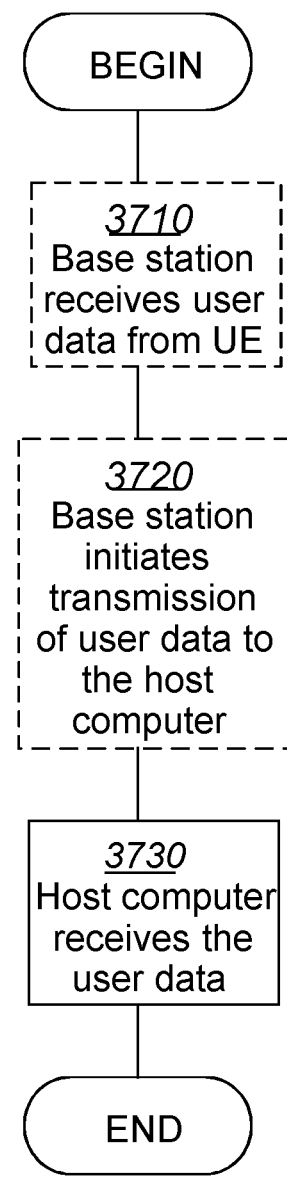
FIG. 16
FIG. 17

OBTAINING AND PROVIDING POSITIONING ASSISTANCE DATA

CROSS REFERENCE TO RELATED APPLICATIONS

This application is a 35 U.S.C. § 371 national stage application of PCT International Application No. PCT/SE2020/050272 filed on Mar. 17, 2020, which in turn claims domestic priority to U.S. Provisional Patent Application No. 62/820,291, filed on Mar. 19, 2019, the disclosures and content of which are incorporated by reference herein in their entirety.

TECHNICAL FIELD

Embodiments herein relate to a target device, a location server and methods therein. In particular, they relate to obtaining positioning assistance data from the location server and to provide positioning assistance data to the target device.

BACKGROUND

In a typical wireless communication network, wireless devices, also known as wireless communication devices, mobile stations, stations (STA) and/or User Equipments (UE), communicate via a Local Area Network (LAN) such as a WiFi network or a Radio Access Network (RAN) to one or more Core Networks (CN). The RAN covers a geographical area which is divided into service areas or cell areas, which may also be referred to as a beam or a beam group, with each service area or cell area being served by a radio network node such as a radio access node e.g., a Wi-Fi access point or a Radio Base Station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Positioning of a UE, sometimes referred to as UE positioning, is recognized as an important feature for the LTE and the 5G networks due to its potential for massive commercial applications in for example intelligent transportation, entertainment, industry automation, robotics, remote operation, healthcare, smart parking and so on, as well as its relevance to US FCC E911 requirements.

Positioning in LTE is supported by the architecture schematically shown in FIG. 1, with direct interactions between a UE and a location server, such as an E-SMLC, is via the LTE Positioning Protocol (LPP). Moreover, there are also interactions between the location server and the eNodeB via the LPPa protocol, to some extent supported by interactions between the eNodeB and the UE via the Radio Resource Control (RRC) protocol.

The following positioning techniques are considered in LTE:
  Enhanced Cell ID. Essentially cell ID information to associate the UE to the serving area of a serving cell, and then additional information to determine a finer granularity position.
  Assisted GNSS. GNSS information retrieved by the UE, supported by assistance information provided to the UE from E-SMLC
  Observed Time Difference of Arrival (OTDOA). The UE estimates the time difference of reference signals from different base stations and sends to the E-SMLC for multilateration.
  Uplink Time Difference of Arrival (UTDOA). The UE is requested to transmit a specific waveform that is detected by multiple location measurement units (e.g. an eNB) at known positions. These measurements are forwarded to E-SMLC for multilateration Recent enhancements in GNSS technology include Real Time Kinematic (RTK) GNSS, which is a differential GNSS positioning technology which enables positioning accuracy improvement from metre level to decimetre or even centimetre level in the right conditions in real-time by exploiting the carrier phase of the GNSS signal rather than only the code phase. Support for RTK GNSS in LTE networks should therefore be provided and are under standardization in the Release 15 work item. The support for RTK in LTE networks comprises providing RTK correction data as part of positioning assistance data to the UE via LPP. Three provisioning means of positioning assistance data to the UE are supported:
  Unicast via a user plane connection
  Unicast via a control plane connection
  Broadcast via system information broadcast The unicast provisioning of positioning assistance data is also supported by NR devices, while NR broadcast is also a plausible enhancement that can be specified.

US20140113608A1 discusses how to change from a first Virtual Reference Receivers (VRR) to a second VRR in a system providing periodic assistance data, where the first and second VRRs are generated location references.

SUMMARY

As a part of developing embodiments herein a problem will first be identified and discussed. For unicast provisioning of positioning assistance data, the location server is made aware of the logical position of the UE, e.g. the target device, by obtaining information such as the tracking area, identity of the serving cell, etc. The logical position information of the target device is used in the location server to determine how to compile the positioning assistance data. The positioning assistance data may optionally be provided periodically at a number of points in time.

By the expression "logical position" when used in this disclosure is meant an association between the target device and a network entity. Examples of network entities, e.g. physical network entities, comprises a radio base station, a radio network node, a Transmission Point (TP), a Reception Point (RP), a Transmission and Reception Point (TRP), a Remote Radio Head (RRH), etc. The physical network entities are typically assigned identifiers, e.g. identities (IDs) such as an eNB ID, a gNB ID, a base station ID, a TP ID, an RP ID, a TRP ID, a RRH ID, etc. The physical network entities may also be assigned a reference signal with an ID, such as a cell specific reference signal, a physical cell ID, a channel state information reference signal, or a group of network entities may be assigned an ID such as a tracking area (TA) code or ID, a routing area ID, a location area ID etc.

A logical position may in the location server, e.g. by the location server, be mapped to a physical position. For example, a target device may report its logical position in terms of the cell ID of the serving cell to the location server, and the location server may map this logical position to a physical position, e.g. a geographic position, using the configured mapping.

In the existing solutions for providing periodic positioning assistance data via unicast, the logical position information is only provided once, while the logical position of a target device may change due to mobility. Thereby, the periodic positioning assistance data provided by the location server will not take the mobility of the target device, e.g. the UE, from a first logical position to a second logical position into account when determining the periodic positioning assistance data. Thus, if a first positioning assistance data was determined at a first point in time and a second positioning assistance data determined at a second point in time, the location server will not take into account a movement of the target device from a first logical position at the first point in time to a second logical position at the second point in time.

An object of embodiments herein is therefore to provide an improved way of providing position assistance data whereby the performance of a wireless communications network is improved.

According to an aspect of embodiments herein, the object is achieved by a method performed by a target device to obtain positioning assistance data from a location server. The target device and the location server are operating in a wireless communications network. The target device transmits a request to the location server. The request is a request for positioning assistance data and provides first logical position information. The target device obtains positioning assistance data from the location server. The positioning assistance data is based on the first logical position information. When being associated with a second logical position, the target device transmits a request to the location server. The request requests for positioning assistance data and provides second logical position information. The target device obtains positioning assistance data from the location server. The positioning assistance data is based on the second logical position information.

According to another aspect of embodiments, the object is achieved by a method performed by a location server to provide positioning assistance data to a target device. The target device and the location server are operating in a wireless communications network. The location server obtains a request from the target device. The request is a request for positioning assistance data and first logical position information. The location server provides positioning assistance data to the target device. The positioning assistance data is based on the first logical position information. The location server obtains a request from the target device. The request is a request for positioning assistance data and second logical position information. The location server provides positioning assistance data to the target device. The positioning assistance data is based on the second logical position information.

According to an aspect of embodiments herein, the object is achieved by target device to obtain positioning assistance data from a location server. The target device and the location server are operable in a wireless communications network.

The target device comprises a transmitting unit configured to transmit to the location server, a request for positioning assistance data and providing first logical position information, and an obtaining unit configured to obtain from the location server, positioning assistance data, based on the first logical position information.

The transmitting unit is further configured to, when being associated with a second logical position, transmit to the location server, a request for positioning assistance data and provide second logical position information.

The obtaining unit is further configured to obtain from the location server, positioning assistance data, based on the second logical position information.

According to another aspect of embodiments, the object is achieved by a location server to provide positioning assistance data to a target device. The target device and the location server are operable in a wireless communications network.

The location server comprises an obtaining unit configured to obtain from the target device, a request for positioning assistance data and first logical position information; and a providing unit configured to provide to the target device, positioning assistance data based on the first logical position information.

The obtaining unit is further configured to obtain from the target device, a request for positioning assistance data and second logical position information; and The providing unit is further configured to provide to the target device, positioning assistance data, based on the second logical position information.

An advantage of embodiments disclosed herein is that they enable provisioning of positioning assistance data, based on logical position information such as the second logical position information, for the case of mobile target devices where the logical position information changes because of the target devices are moving.

This results in an improved way of providing position assistance data whereby the performance of a wireless communications network is improved.

BRIEF DESCRIPTION OF THE DRAWINGS

Examples of embodiments herein are described in more detail with reference to attached drawings in which:

FIG. 2A is a schematic block diagram illustrating prior art.

FIG. 3A is a flowchart depicting embodiments of a method performed by a target device.

FIG. 4A is a flowchart depicting embodiments of a method performed by a location server.

FIG. 5 is a signalling diagram depicting embodiments of a method.

FIG. 11 is a table depicting examples of information elements according to embodiments herein.

FIGS. 14-17 are flowcharts illustrating methods implemented in a communication system including a host computer, a base station and a user equipment.

DETAILED DESCRIPTION

Some embodiments disclosed herein relate to facilitate seamless positioning session continuity and/or to allow a location server to route the positioning periodic message, e.g. periodic positioning assistance data, in the correct location when a target device, e.g. the UE, has moved from a first location to a second location.

By the expression "seamless positioning session continuity" is meant that the provisioning of periodic assistance data to the target device is contiguous even when the target device is mobile and will change its logical position and physical position over time.

Some embodiments disclosed herein relate to methods to update logical position information for periodic positioning assistance data provisioning.

It should be understood that one or more features from one or more exemplifying embodiments described herein may be combined.

Embodiments herein may refer to positioning, assistance data, GNSS, RTK.

An advantage of embodiments disclosed herein is that they enable provisioning of positioning assistance data based on logical position information for the case of mobile target devices.

Figure 1:
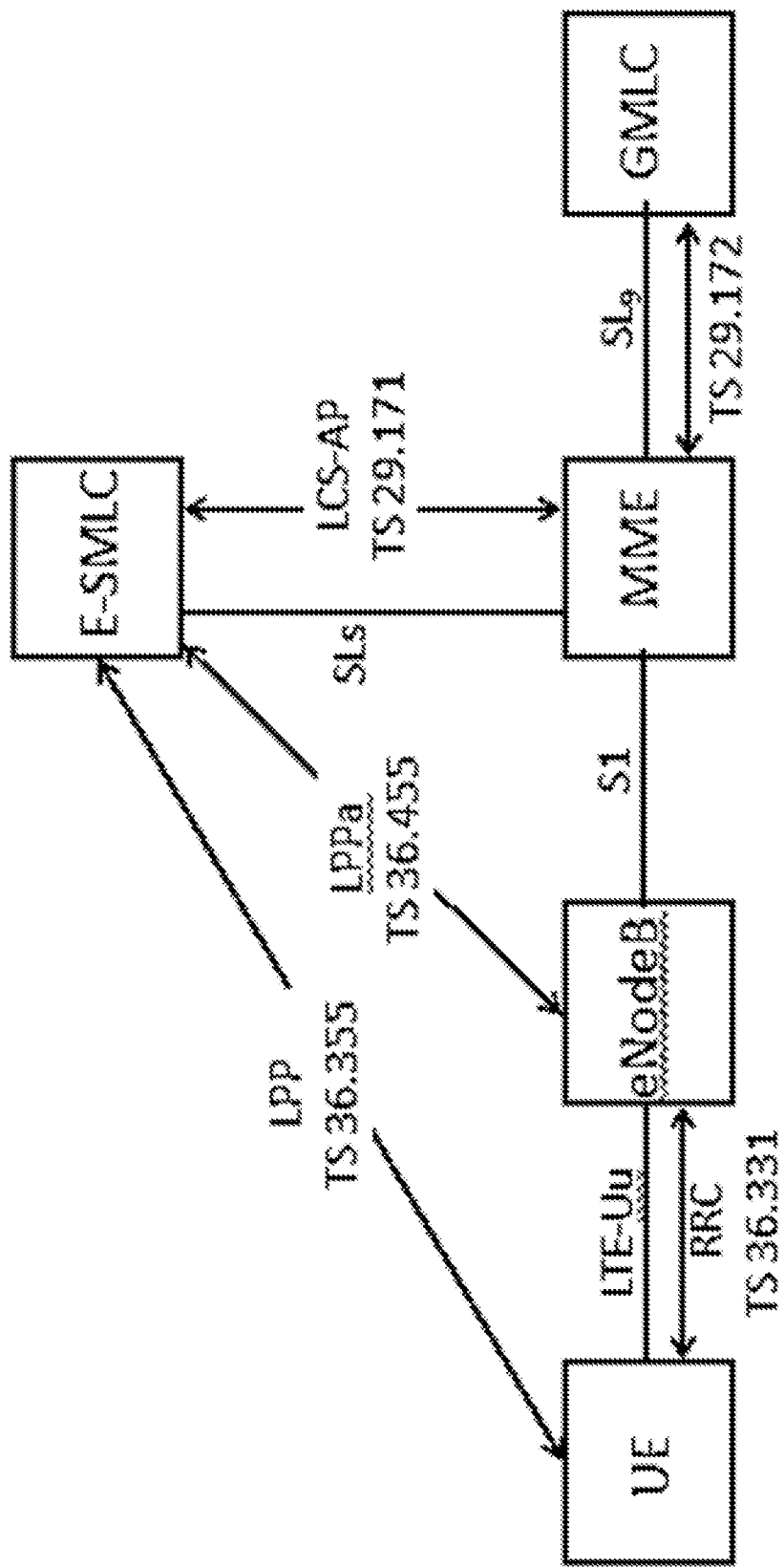
FIG. 1 is a schematic block diagram illustrating prior art.
Figure 2B:
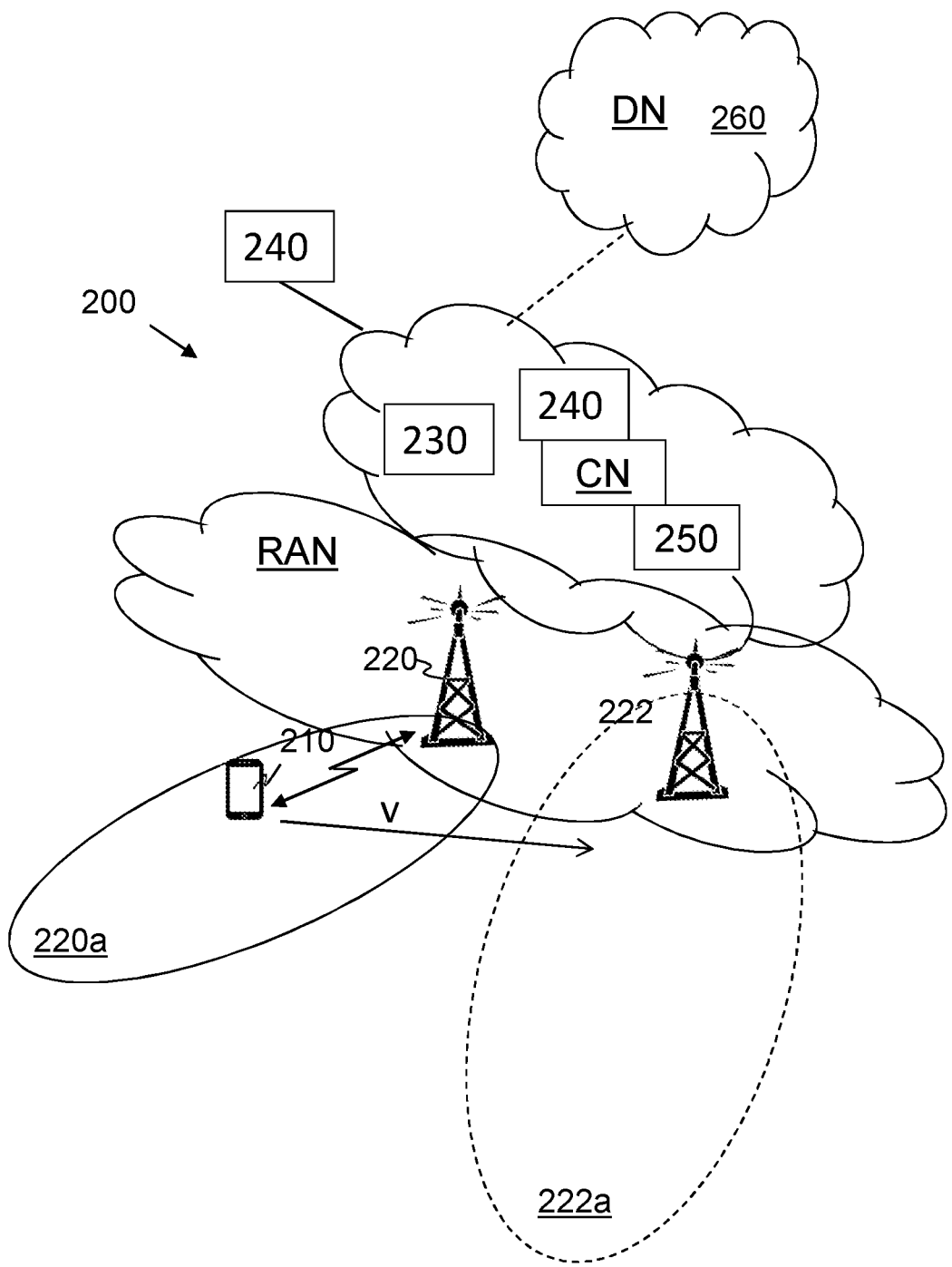
FIG. 2B is a schematic block diagram illustrating embodiments of a wireless communications network.

Embodiments herein relate to wireless communication networks in general. FIGS. 2A and 2B is a schematic overview depicting a wireless communications network 200. The wireless communications network 200 may be referred to as a radio communications network. The wireless communications network 200 comprises one or more Radio Access Networks (RANs) and one or more Core Networks (CNs). The radio communications network 100 may use a number of different technologies, such as NB-IoT, CAT-M, Wi-Fi, eMTC, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Sometimes in this disclosure the wireless communications network 200 is referred to as just a network.

In the wireless communication network 200, wireless devices e.g. a wireless device 210 also referred to as the first UE 210, is operating in the wireless communications network 200. One or more further wireless devices may operate in the wireless communications network 200. As schematically illustrated in FIGS. 2A, 2B, the wireless device 210 may communicate with a network node, e.g. a radio network node 220 which will be described below.

The wireless device 210 may e.g. be a mobile station, a non-Access Point (non-AP) STA, a STA, a user equipment and/or a wireless terminals, an NB-IoT device, an eMTC device and a CAT-M device, a WiFi device, an LTE device and an NR device communicate via one or more Access Networks (AN), e.g. RAN, to one or more Core Networks (CN). It should be understood by the skilled in the art that "wireless device" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell. In this disclosure, the wireless device 210 is sometimes referred to as a target device, and the terms wireless device and target device may be used interchangeably.

Network nodes operate in the radio communications network 200, such as a radio network node 220 also referred to as a first network node 220, providing radio coverage over a geographical area, a service area 220a, which may also be referred to as a cell, a beam or a beam group of a Radio Access Technology (RAT), such as 5G, LTE, Wi-Fi, NB-IoT, CAT-M, Wi-Fi, eMTC or similar. A second radio network node 222 is operating in the wireless communications network 200 and provides radio coverage over a geographical area, a service area 222a, which may also be referred to as a cell, a beam or a beam group of a Radio Access Technology (RAT), such as 5G, LTE, Wi-Fi, NB-IoT, CAT-M, Wi-Fi, eMTC or similar. The network nodes 220,222 may be a transmission and reception point e.g. a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the network node 220,222 depending e.g. on the radio access technology and terminology used. The network node 220,222 may be referred to as a serving radio network node and communicates with the wireless device 210 with Downlink (DL) transmissions to the wireless device 210 and Uplink (UL) transmissions from the wireless device 210.

Further network nodes operate in the radio communications network 200, such as a core network node 250. The core network node may be an MME which is a control node for an LTE access network, a Serving Gateway (SGW), and a Packet Data Network Gateway (PGW). An MME is amongst other responsible for tracking and paging procedure including retransmissions. Further, the network node 250 may be an Operation And Maintenance (OAM) node such as an OSS-RC (Operation and Support System Radio and Core (OSS-RC) node or an Ericsson Network Management (ENM) node. As another example the network node 250 may be an Access Management Function (AMF) of the 5G core network.

A location server 230 and a positioning server 240 operate in the radio communications network 200. For example, the location server 230 may be an E-SMLC as in LTE or an LMF as in 5G, e.g. a location management function, and the positioning server 240 may be an RTK server. The location server 230 and the positioning server 240 may communication with each other over a communications interface.

It should be understood that the positioning server 240 may be arranged external of the radio communications network 200 and in such a scenario the positioning server 240 may be referred to as an external positioning server 240 and the location server 230 and the positioning server 240 may communicate over an IP interface.

The positioning server 240 may sometimes herein be referred to as an RTK server, a Network RTK server or an RTK network provider.

Methods according to embodiments herein may be performed by any of the network node 220,222 such as e.g. a first or second radio network node 220,222, the wireless device 210, e.g. the UE, the location server 230 and/or by the positioning server 240. As an alternative, a Distributed Node (DN) and functionality, e.g. comprised in a cloud 260 may be used for performing or partly performing the methods.

Actions of Some Embodiments Herein

Example embodiments of a flowchart depicting embodiments of a method performed by the target device 210, e.g. to obtain positioning assistance data, is depicted in FIG. 3A and will be described more in detail in the following. The target device 210 and the location server 230 are operating in the wireless communications network 200.

The method may comprise one or more of the following actions which actions may be taken in any suitable order. Further, it should be understood that one or more actions may be optional and that actions may be combined.

In embodiments disclosed herein the target device 210 provides updated logical position information to the location server 230. The expression "logical position information" when used herein refers to an identifier of a network entity, associated to the target device 210. Such information may be an identity of a cell, e.g. the first cell 220a, serving the target device 210. Other examples of logical position information are base station ID, eNB ID, gNB ID, TRP ID, TP ID, RP ID, RRH ID, tracking area code, etc. The updated logical position information relates to updated information of the target device's 210 position. For example, when the target device 210 has moved from a first position served by the first cell 220a to a second position served by a second cell 222a, the updated position information relates to the second cell 222a and may for example be the identity of the second cell 222a.

In action 301, the target device 210 requests positioning assistance data and provides a first logical position information to the location server 230.

The target device 210 may request the location server 230 to send the positioning assistance data. The request may be transmitted from the target device 210 to the location server 230, transparent through the radio network node 220 or via the radio network node 220 serving the target device 210.

In action 302, the target device 210 obtains positioning assistance data from the location server 230. The positioning assistance data is based on the first logical position information, e.g. based on the first cell 220a. The positioning assistance data may be periodic positioning assistance data obtained from the location sever 230. By the term "obtain" when used herein means that the target device 210 may receive or retrieve the positioning assistance data from the location server 230. The positioning assistance data may be obtained directly from the location server 230 transparent through the radio network node 220 serving the target device 210 or via the radio network node 220 serving the target device 210.

By the expression "periodic positioning assistance data" when used herein is meant positioning assistance data obtained at a number of points in time or instants in time, typically regular points in time or time instants. Thus, by obtaining periodic positioning assistance data the target device 210 will obtain updated positioning assistance data based on the logical position information.

In action 303, the target device 210 becomes associated to a second logical position, such as a second cell 222a. This may be because the target device 210 has moved from the first location to the second location.

In action 304, the target device 210 sends a positioning assistance data request comprising a second logical position information to the location server 230. This is to enable the location server 230 to take into account the movement of the target device 210 from the first logical position to the second logical position for updating the positioning assistance data.

In action 305, the target device 210 obtains positioning assistance data associated to the second logical position to confirm the request.

In action 306, the target device 210 obtains periodic positioning assistance data associated to the second logical position. Thus, by obtaining periodic positioning assistance data the target device 210 will obtain updated positioning assistance data based on the second logical position information and associated to the second logical position.

In action 307, the target device 210 uses the provided positioning assistance data to enable positioning of the target device 210. Thus, by means of the obtained positioning assistance data the target device 210 determines it's position. In this way the movement of the target device 210 from the first logical position to the second logical position has been taken into account for updating the positioning assistance data, resulting in an accurate determining of the position of the target device 210.

The first logical position information may be information about the first logical position corresponding to the first cell 220a served by the first radio network node 220 and the second logical position information may be information about a second logical position corresponding to the second cell 222a served by the second radio network node (222).

Figure 3B:
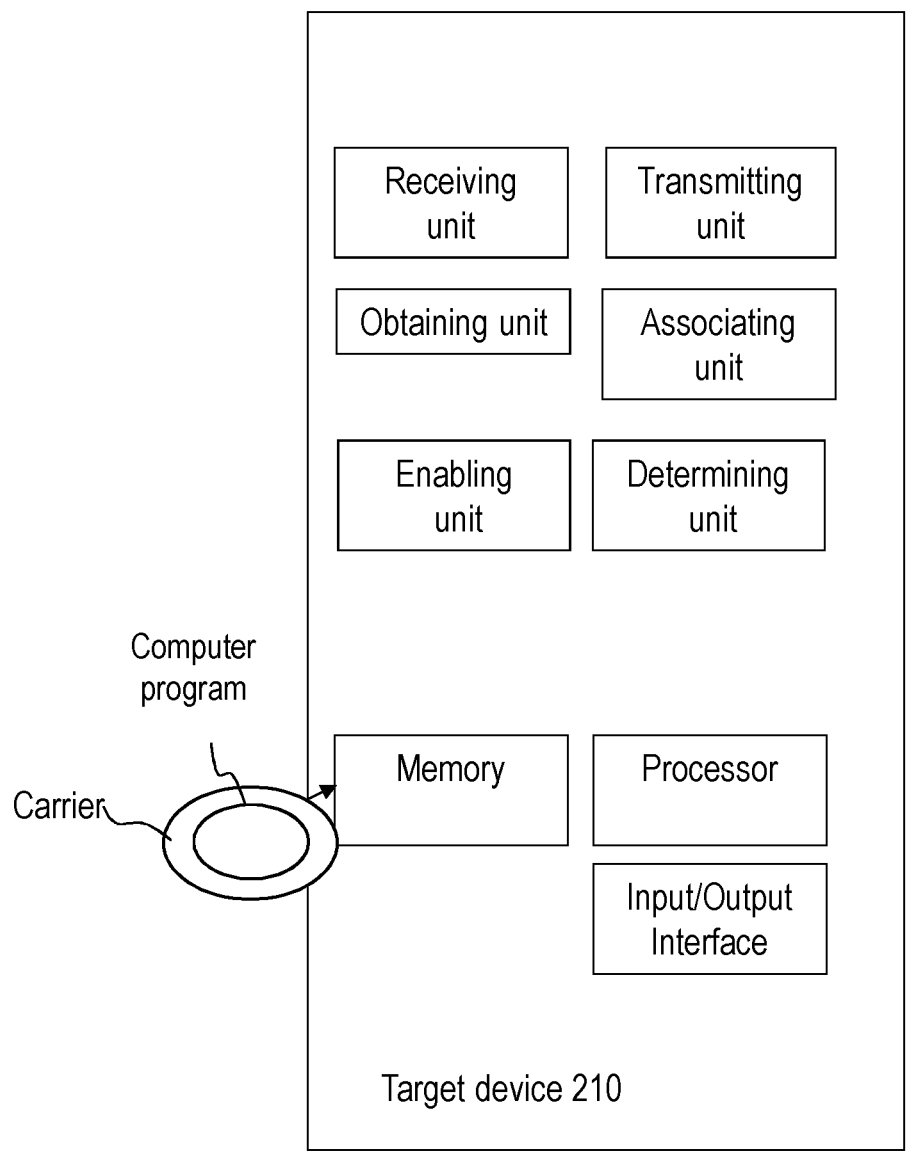
FIG. 3B is a schematic block diagram depicting embodiments of a target device.

To perform the method actions e.g. to obtain positioning assistance data, the target device 210 may comprise the arrangement depicted in FIG. 3B. As mentioned above, the target device 210 and the location server 230 are operable in a wireless communications network 200. The target device 210 may e.g. comprise a transmitting unit, a receiving unit, an obtaining unit, an associating unit, and an enabling unit.

The target device 210 comprises the transmitting unit configured to transmit to the location server 230, a request for positioning assistance data and providing first logical position information.

The target device 210 further comprises the obtaining unit configured to obtain from the location server 230, positioning assistance data, based on the first logical position information.

The transmitting unit is further configured to, when being associated with a second logical position, transmit to the location server 230, a request for positioning assistance data and provide second logical position information.

The obtaining unit is further configured to obtain from the location server 230, positioning assistance data, based on the second logical position information.

In some embodiments, the obtained positioning assistance data is to be used to determine the position of the target device 210.

The positioning assistance data may be periodic positioning assistance data obtained at a number of periodic points in time in order to obtain updated positioning assistance data.

The first logical position information may be information about a first logical position corresponding to the first cell 220a served by the first radio network node 220 and the second logical position information may be information about the second logical position corresponding to the second cell 222a served by the second radio network node 222.

Those skilled in the art will also appreciate that the units in the target device 210 described above may refer to a combination of analogue and digital circuits, and/or one or more processors configured with software and/or firmware, e.g. stored in target device 210, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The target device 210 may comprise an input and output interface configured to communicate with one or more network nodes, e.g. with one or more of the network nodes 220,222, the location server 230, and the positioning server 240. The input and output interface may comprise a wireless receiver (not shown) and a wireless transmitter (not shown).

The embodiments herein may be implemented through a respective processor or one or more processors, such as the processor of a processing circuitry in target device 210 depicted in FIG. 3B, together with respective computer program code for performing the functions and actions of the embodiments herein. The program code mentioned above may also be provided as a computer program product, for instance in the form of a data carrier carrying computer program code for performing the embodiments herein when being loaded into the target device 210. One such carrier may be in the form of a CD ROM disc. It is however feasible with other data carriers such as a memory stick. The computer program code may furthermore be provided as pure program code on a server and downloaded to the target device 210.

The target device 210 may further comprise a memory comprising one or more memory units. The memory comprises instructions executable by the processor in the target device 210.

The memory is arranged to be used to store e.g. data, configurations, and applications to perform the methods herein when being executed in the target device 210.

Some embodiments of the target device 210 may comprise:

a radio circuitry configured to transmit one or more requests to the location server 230, to provide logical position information to the location server 230, and to obtain positioning assistance data from the location server 230;

a storage configured to store logical position information and positioning assistance data; and a processing unit configured to determine a position based on received positioning assistance data.

Example embodiments of a flowchart depicting embodiments of a method performed by the location server 230, e.g. to provide positioning assistance data to the target device 210, is depicted in FIG. 4A and will be described more in detail in the following. The method may comprise one or more of the following actions which actions may be taken in any suitable order. Further, it should be understood that one or more actions may be optional and that actions may be combined.

In action 401, the location server 230 obtains, e.g. receives or retrieves, from the target device 210 a positioning assistance data request comprising a first logical position information.

In action 402, the location server 230 provides, e.g. transmits, to the target device 210 positioning assistance data to confirm the request, optionally also periodic positioning assistance data, based on the first logical position information. As mentioned above, the expression periodic positioning assistance data refers to positioning assistance data provided to the target device 210 at a number of points in time or instants in time. The positioning assistance data may be provided periodically at a certain time interval.

In action 403, the location server 230 obtains, e.g. receives or retrieves, from the target device 210 a positioning assistance data request comprising second logical position information. As mentioned above, the second logical position information may relate to a second cell to which the target device 210 has moved. This is to enable the location server 230 to take into account the movement of the target device 210 from the first logical position to the second logical position for updating the positioning assistance data.

In action 404, the location server 230 provides, e.g. transmits, to the target device 210, positioning assistance data associated to, such as based on, the second logical position. The location server 230 may provide the positioning assistance data to confirm receipt of the second logical position information.

In action 405, the location server 230 provides, e.g. transmits, to the target device 210, positioning assistance data, e.g. periodic positioning assistance data, associated to the second logical position.

Figure 4B:
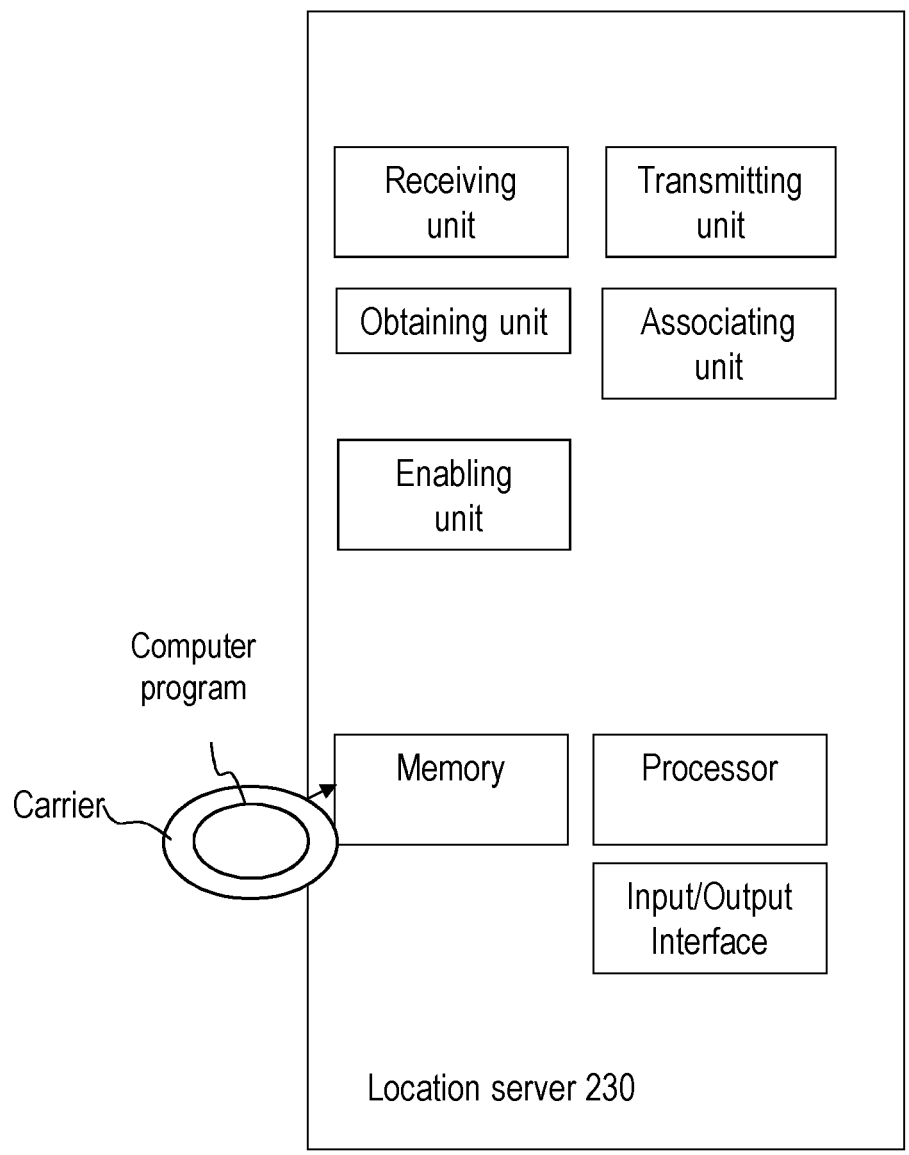
FIG. 4B is a schematic block diagram depicting embodiments of a location server.

To perform the method actions e.g. to provide positioning assistance data, the location server 230 may comprise the arrangement depicted in FIG. 4B. The location server 230 may e.g. comprise a transmitting unit, a receiving unit, an obtaining unit, and a providing unit. As mentioned above, the target device 210 and the location server 230 are operable in a wireless communications network 200.

The location server 230 comprises the obtaining unit configured to obtain from the target device 210, a request for positioning assistance data and first logical position information.

The location server 230 further comprises the providing unit configured to provide to the target device 210, positioning assistance data based on the first logical position information.

The obtaining unit is further configured to obtain from the target device 210, a request for positioning assistance data and second logical position information.

The providing unit is further configured to provide to the target device 210, positioning assistance data, based on the second logical position information.

The positioning assistance data may be periodic positioning assistance data provided at a number of periodic points in time in order to provide updated positioning assistance data.

The first logical position information may be information about a first logical position corresponding to the first cell 220a served by the first radio network node 220 and the second logical position information may be information about a second logical position corresponding to the second cell 222a served by the second radio network node 222.

In an example embodiment, the location server obtains a request from the target device. The request is a request for periodic positioning assistance data and from first logical position information, if the request can be supported. If the request can be supported, the message contains the control parameters in the positioning method specific assistance data. The location server provides positioning assistance data to the target device along with the control parameters. The positioning assistance data is based on the first logical position information. The location server obtains a request from the target device. The request is a request for an update of positioning assistance data and from second logical position information. The location server provides positioning assistance data to the target device. The positioning assistance data is based on the second logical position information.

Those skilled in the art will also appreciate that the units in the location server 230 described above may refer to a combination of analogue and digital circuits, and/or one or more processors configured with software and/or firmware, e.g. stored in location server 230, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

The location server 230 may comprise an input and output interface configured to communicate with one or more network nodes, e.g. with one or more of the network nodes 220,222, the target device 210, and the positioning server 240. The input and output interface may comprise a wireless receiver (not shown) and a wireless transmitter (not shown).

The embodiments herein may be implemented through a respective processor or one or more processors, such as the processor of a processing circuitry in location server 230 depicted in FIG. 4B, together with respective computer program code for performing the functions and actions of the embodiments herein. The program code mentioned above may also be provided as a computer program product, for instance in the form of a data carrier carrying computer program code for performing the embodiments herein when being loaded into the location server 230. One such carrier may be in the form of a CD ROM disc. It is however feasible with other data carriers such as a memory stick. The computer program code may furthermore be provided as pure program code on a server and downloaded to the location server 230.

The location server 230 may further comprise a memory comprising one or more memory units. The memory comprises instructions executable by the processor in the location server 230.

The memory is arranged to be used to store e.g. data, configurations, and applications to perform the methods herein when being executed in the location server 230.

Some embodiments of the location server 230 may comprise:

a radio circuitry configured to obtain one or more requests from the target device 210, to obtain logical position information from the target device 210, and to provide positioning assistance data to the target device 210;

a storage configured to e.g. store logical position information and positioning assistance data; and a processing unit configured to determine positioning assistance data to the target device 210 based on obtained request and logical position information.

In some embodiments, the signalling between the target device 210, the first and second radio network nodes 220, 222 and the location server 230 may be illustrated as schematically shown in FIG. 5. It should be understood that one or more actions may be optional and that actions may be taken in another suitable order. Actions may also be combined.

In action 501, the target device 210 requests positioning assistance data and provides a first logical position information to the location server 230. The first logical position corresponds to the first radio network node 220.

In action 502, the target device 210 obtains positioning assistance data from the location server 230, optionally also periodic assistance data, based on the first logical position information.

In action 503, the target device 210 transmits, to the first radio network node 220, information about the ongoing positioning session before becoming associated to a second logical position corresponding to the second radio network node 222.

In action 504, the first radio network node 220 transmits, to the second radio network node 222, information over an XnAP/X2 (NR/LTE) interface about the ongoing positioning session.

In action 505, the first radio network node 220 or the second radio network node 222 transmits, to the location server 230, information about the change of radio network node via LPPa/NRPPa or via a core network node such as the AMF 250.

In action 506, the location server 230 routes the periodic positioning assistance data to the second radio network node 222.

Below a more detailed description will follow.

Embodiments disclosed herein relate to a positioning scenario as depicted in FIGS. 2A and 2B comprising the target device 210 supported by the location server 230. The location server 230 is configured to provide positioning assistance data to the target device 210. The positioning assistance data may be periodic positioning assistance data, i.e. positioning assistance data provided periodically. Thus, at periodic points in time, the location sever 230 may provide positioning assistance data to the target device 210. The location server 230 may receive the positioning assistance data from an assistance data provider, e.g. from the positioning server 240. The target device 210 may be served by or may be camping at a first radio network node 220 associated to a first logical position information (for example a cell ID), and the first radio network node 220 provides communication services in a first cell 220a. In the shown example, the target device 210 is mobile and moving with a velocity v. Therefore, at a later point in time the target device 210 will be served by or be camping at a second radio network node 222 associated to a second logical position information and providing communication services in a second cell 222a. Furthermore, the first and second radio network nodes 220,222 are associated to a core network node 250, which may route messages between the UE 210 and the location server 230 via the first radio network node 220 or the second radio network node 222. The core network node 250 may interact with the first radio network node 220 and the second radio network node 222. Further, the first radio network node 220 and the second radio network node 222 may have a direct signaling interface between them.

Some embodiments herein describe different means to indicate a change in the logical position of the target device 210 from a first logical position to a second logical position information. Some embodiments herein also describe means to continue with providing periodic positioning assistance data but based on the second logical position information instead of the first logical position information.

One possible situation is that despite a change of logical position from a first logical position to a second logical position, the configuration of the positioning assistance data remains the same. This is the case, since the same configuration is applicable across rather wide spatial regions.

Figure 6:
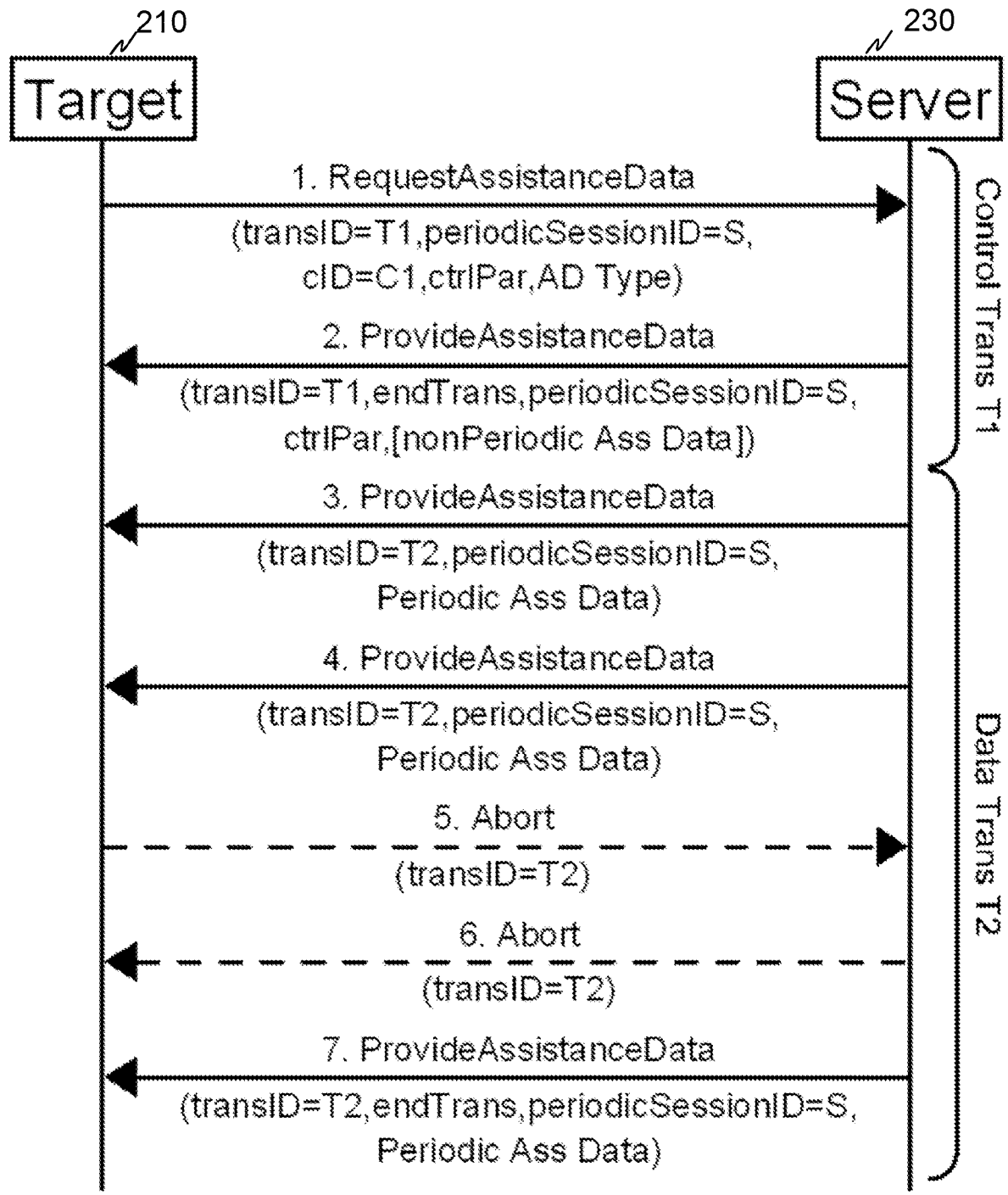
FIG. 6 is a signalling diagram depicting embodiments of a method.

The basic signaling flow with a target device 210 sending a first logical position information to the location server 230 and obtaining periodic positioning assistance data is known in the art and documented in 3GPP TS 36.355 V.15.1.0. For reference, the signaling flow is depicted in FIG. 6 and the following seven messages 1-7: In the below example, the target device 210 is referred to as "target", and the location server 230 is referred to as "server".

1. The target sends a RequestAssistanceData message to the server using some available transactionID T1. The message contains a periodicSessionID S (different to any other periodicSessionID currently in use between the target and server) in the IE CommonIEsRequestAssistanceData. The message also includes a positioning method specific assistance data request element (e.g., IE A-GNSS-RequestAssistanceData) identifying the type of assistance data being requested together with desired periodicity conditions for sending it and a duration for ending the assistance data transfer (e.g., in IE GNSS-PeriodicAssistDataReq).

2. The server responds with a ProvideAssistanceData message to the target. The message uses the transactionID T1 in action 1 and indicates the end of this transaction. The message contains the periodicSessionID S in IE CommonIEsProvideAssistanceData. If the request can be supported, the message contains the control parameters in the positioning method specific assistance data (e.g., IE A-GNSS-ProvideAssistance-Data) which may confirm or redefine the type of assistance data or periodicity parameters requested at action 1 (e.g., in IE GNSS-PeriodicAssistData). If the target requested non-periodic assistance data in addition to the periodic assistance data in action 1, the ProvideAssistanceData message may also include the non-periodic assistance data in this action 2 (but not any periodic assistance data).

If the request cannot be supported (fully or partly), an error reason is provided in the positioning method specific IE (e.g., IE A-GNSS-Error). If the request cannot even partly be supported remaining steps are then not performed.

NOTE 2: The target infers from an absence of the periodicSessionID that the server does not support periodic assistance data delivery. In that case, the target device does not expect the Data Transaction (Actions 3-7).

3. When the first periodic message is available, the server sends an unsolicited ProvideAssistanceData message to the target containing the periodicSessionID S and the periodic assistance data confirmed in action 2. The message uses some available transactionID T2 that may be different to T1.

NOTE 3: The positioning method specific control parameters (e.g., IE GNSS-PeriodicAssistData) are not included in the data transaction.

4. The server may continue to send further ProvideAssistanceData messages to the target containing the periodic assistance data confirmed or redefined in action 2 when each additional periodicity condition occurs.

NOTE 4: The target expects a ProvideAssistanceData messages at the in Step 2 confirmed interval(s). If some or all of the assistance data is not available at each periodic interval, an error indication is provided in the positioning method specific IE (e.g., IE A-GNSS-Error).

5. If the target device requires the session to end, the target sends an Abort message to the server for transaction T2 that may optionally include an abortCause. Remaining steps are then omitted.

6. If the server requires the session to end, the server sends an Abort message to the target for transaction T2 that may optionally include an abortCause. Remaining steps are then omitted.

7. When the duration or other conditions for ending the periodic assistance data transfer occur, the last ProvideAssistanceData message transferred indicates the end of transaction T2.

Signaling Embodiments

Exemplifying embodiments will now be described in more detail with reference to different signaling flows as illustrated by FIGS. 7 to 10.

Figure 7A:
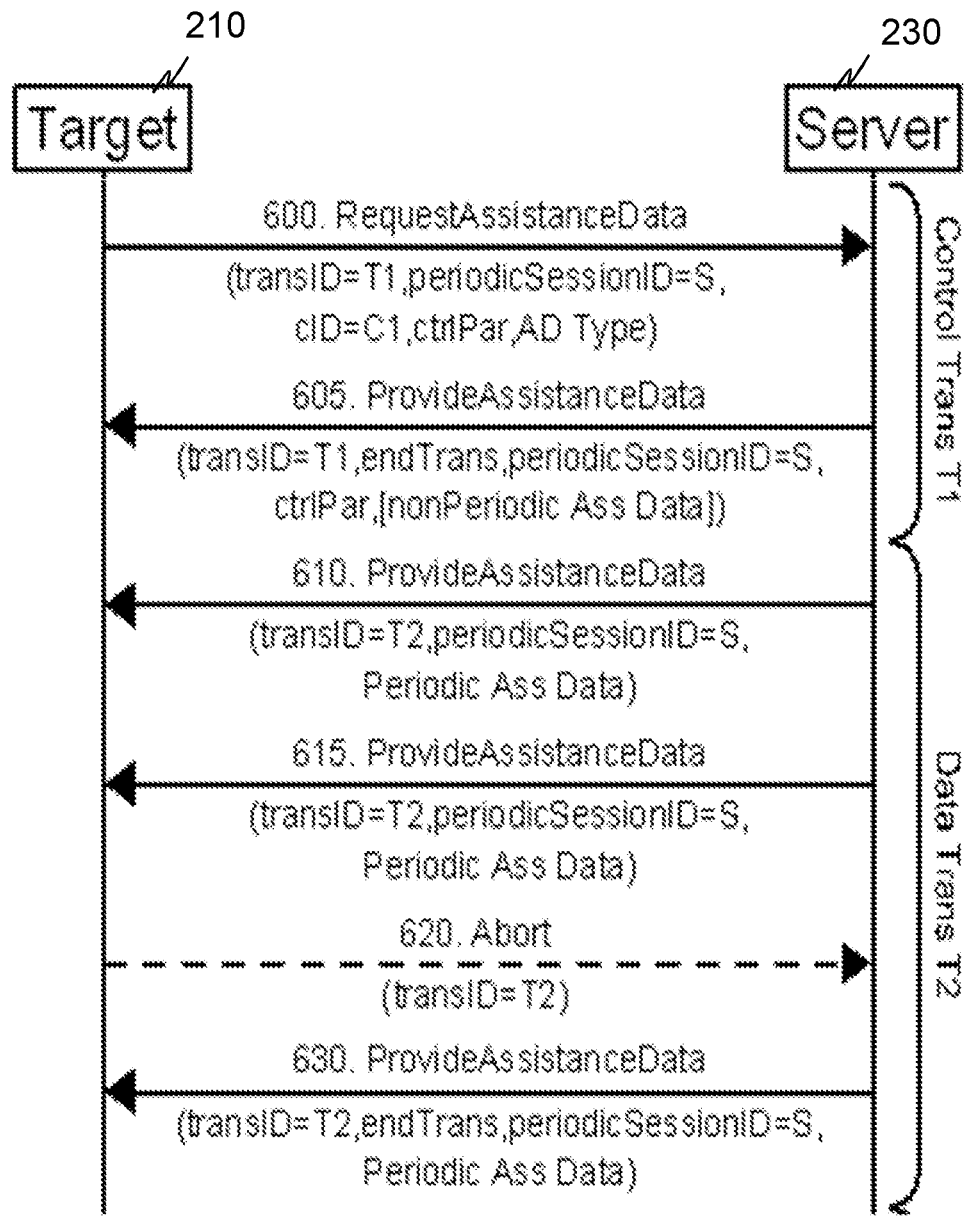
FIG. 7A is a signalling diagram depicting embodiments of a method.
Figure 7B:
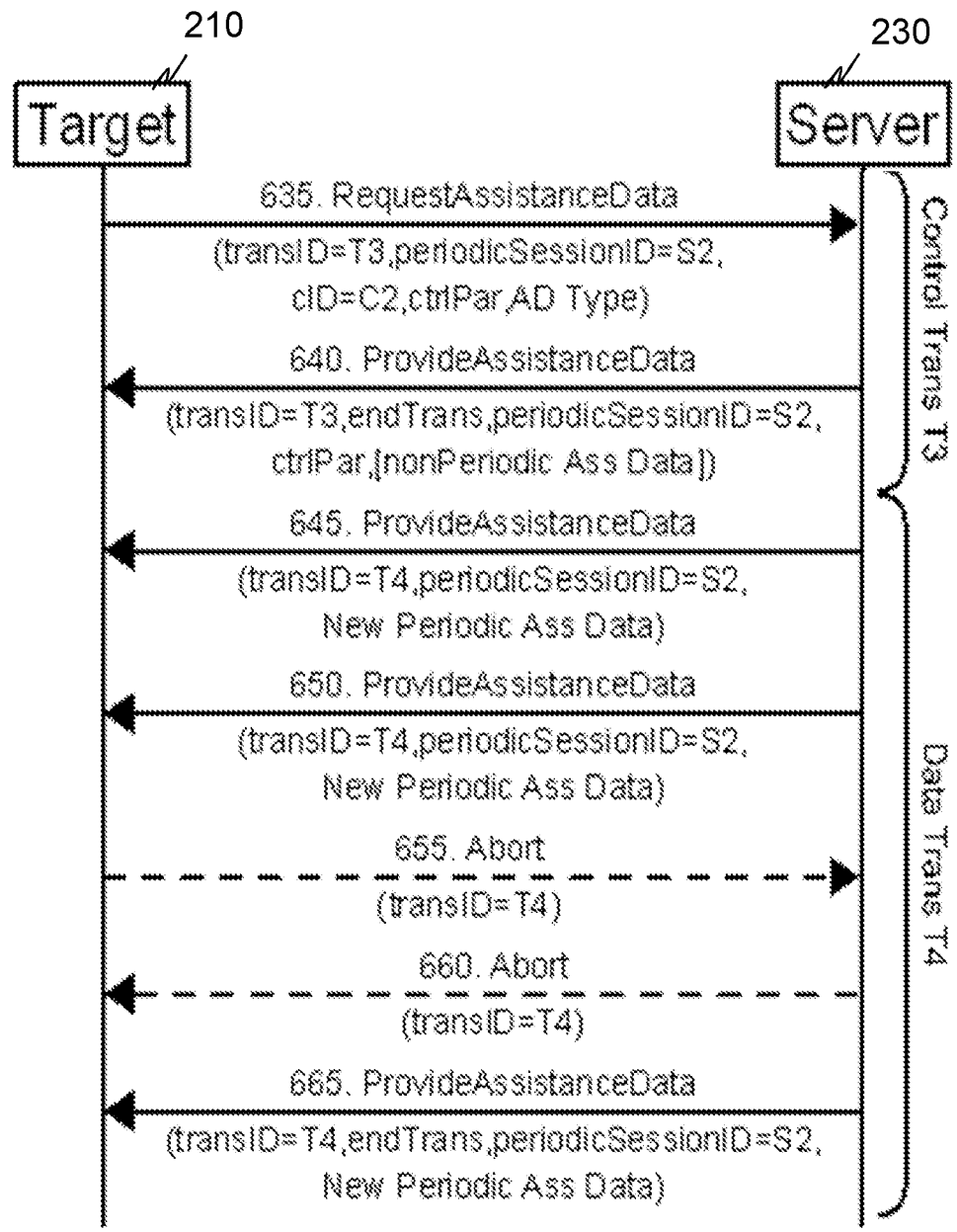
FIG. 7B is a signalling diagram depicting embodiments of a method.

FIGS. 7A (steps 600-630) and 7B (steps 635-665) schematically illustrate a signaling chart depicting an example embodiment herein. The target device 210 first aborts 620, 665, 660 ongoing periodic transactions, e.g. ongoing periodic transmission of positioning assistance data, and then requests 635 and receives 640, 645, 650, 665 new periodic transmissions of positioning assistance data. This relates to Actions 304, 305, 306, 403, 404 and 404 described above.

Figure 8A:
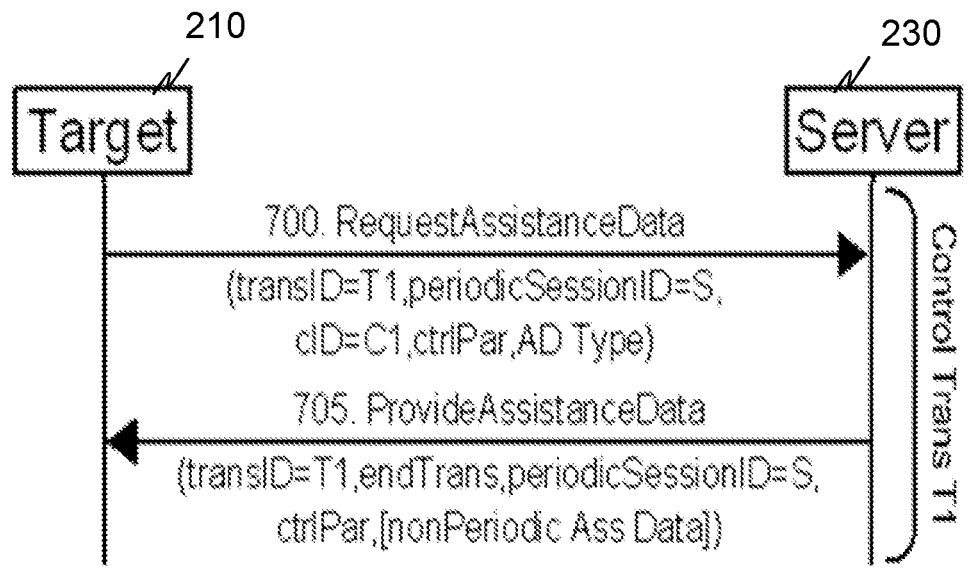
FIGS. 8A and B are signalling diagrams depicting embodiments of a method.

FIGS. 8A (steps 700-705) and 8B (steps 710-730) schematically illustrate a signaling chart depicting an example embodiment herein. The target device 210 indicates an updated logical position by requesting 716 and obtaining a confirmation by obtaining 717 non-periodic transmissions of positioning assistance data again, cf. control transaction T3 in FIG. 8. The updated positioning assistance data is obtained in periodic transmissions 719. This relates to Actions 304, 305, 306, 403, 404 and 404 described above.

a signaling chart depicting an example embodiment herein. The target device 210 indicates an updated logical position by requesting 716 periodic transmissions of positioning assistance data again and obtains a confirmation by obtaining 717 a non-periodic transmissions of positioning assistance data again, cf. control transaction T3 in FIG. 8. The updated positioning assistance data is obtained in periodic transmissions 719. This relates to Actions 304, 305, 306, 403, 404 and 404 described above.

Figure 9A:
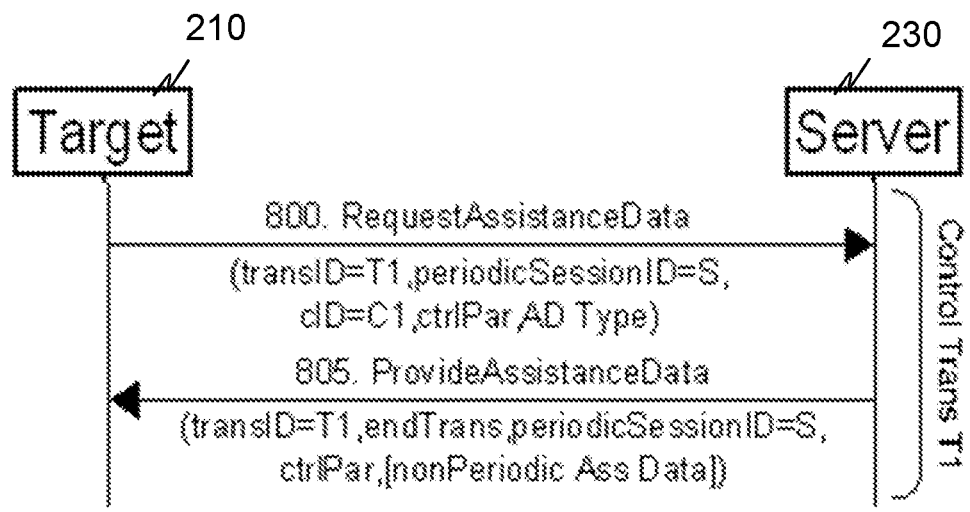
FIGS. 9A, B and C are signalling diagrams depicting embodiments of a method.
Figure 9B:
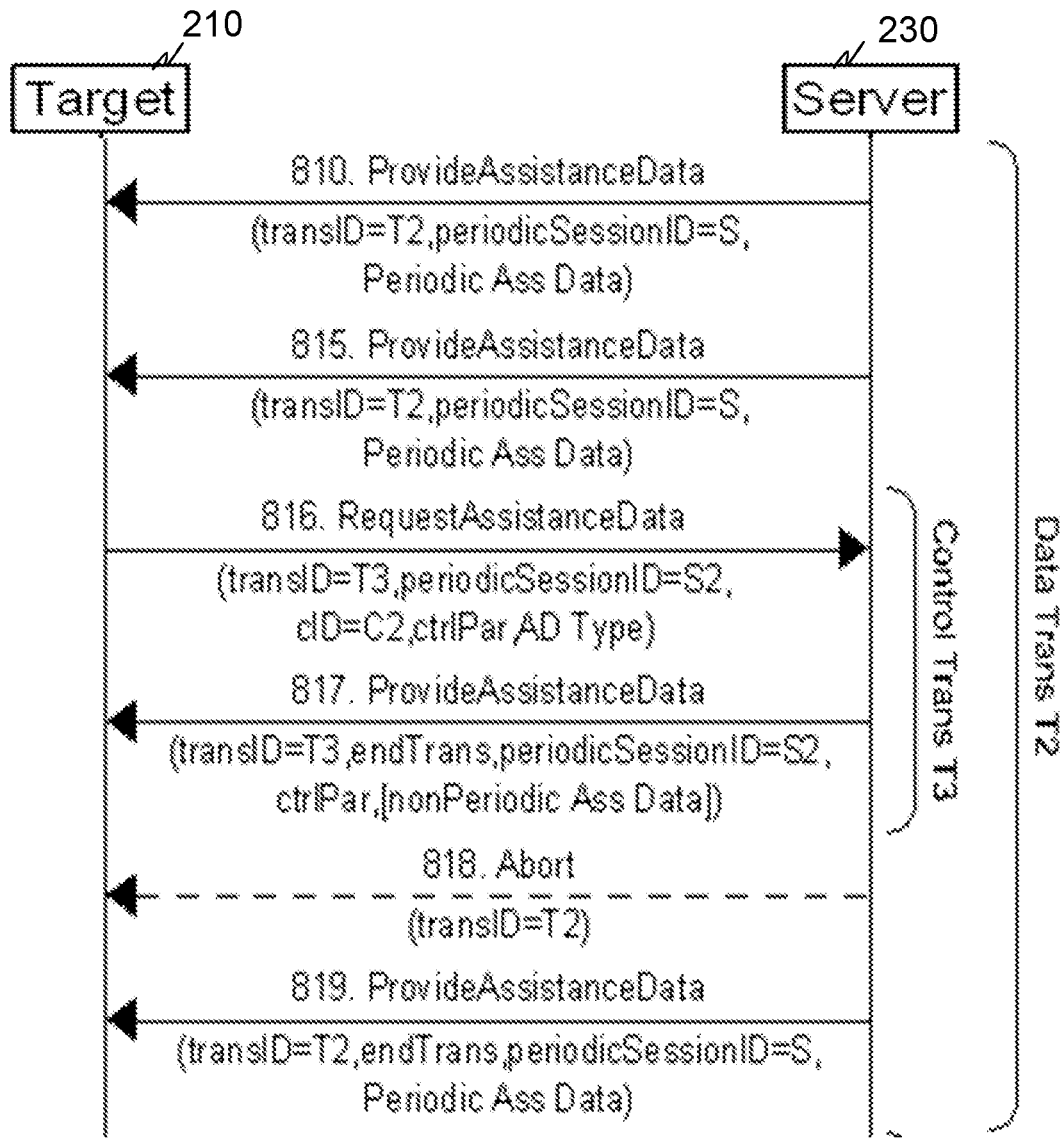
Figure 9C:
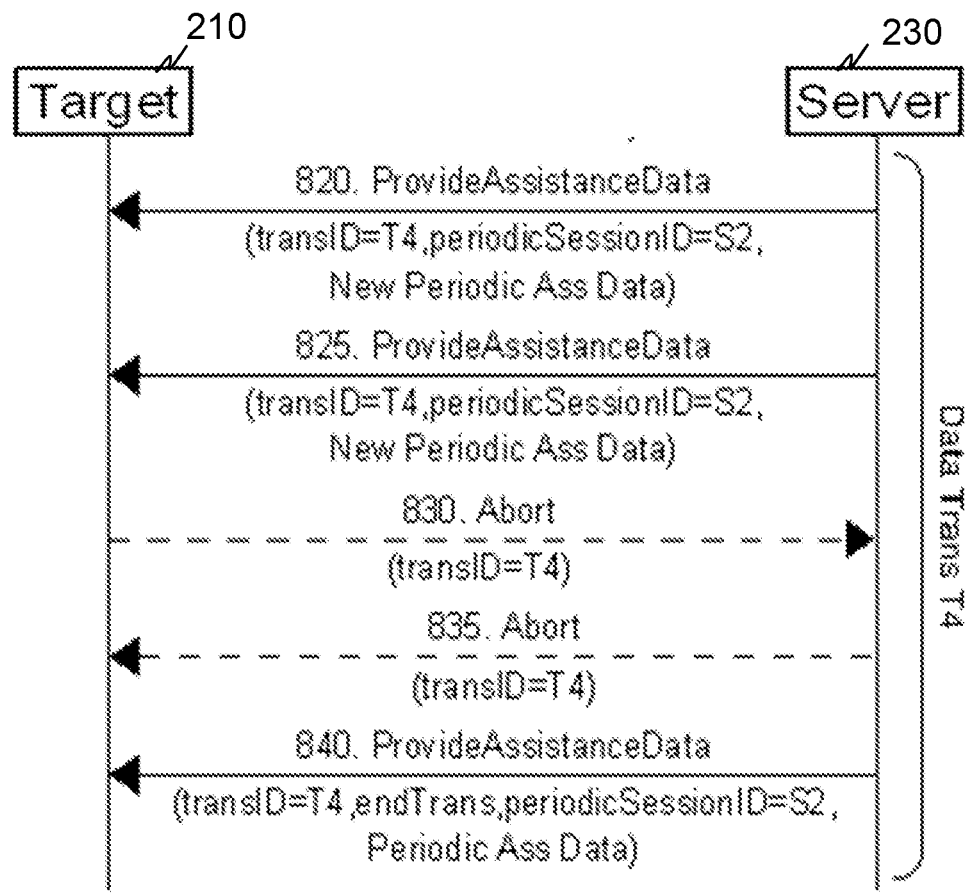

FIGS. 9A, 9B and 9C schematically illustrate a signaling chart depicting an example embodiment herein.

The target device 210 indicates an updated logical position by requesting 816 periodic transmissions of positioning assistance data. In this scenario, the request triggers an abort 818 from the location server 230 and an end to the current periodic provisioning of the positioning assistance data and the initiation of a new transmission of periodic positioning assistance data.

Figure 8B:
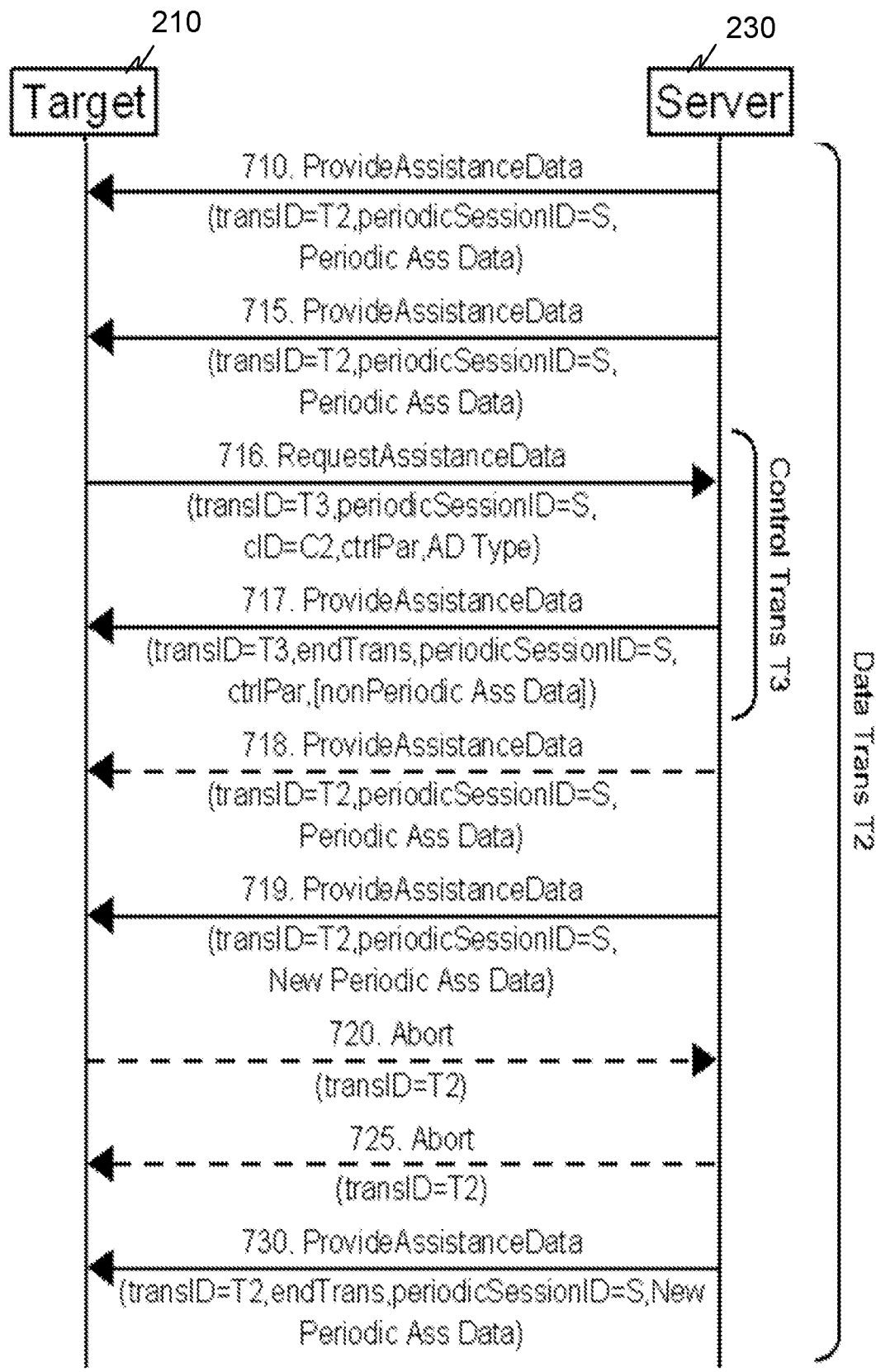
Figure 10A:
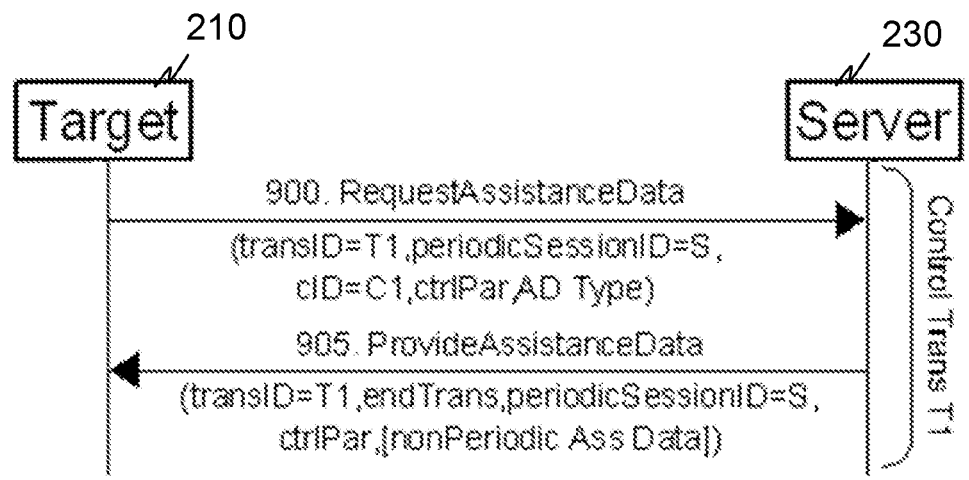
FIGS. 10A, B and C are signalling diagrams depicting embodiments of a method.
Figure 10B:
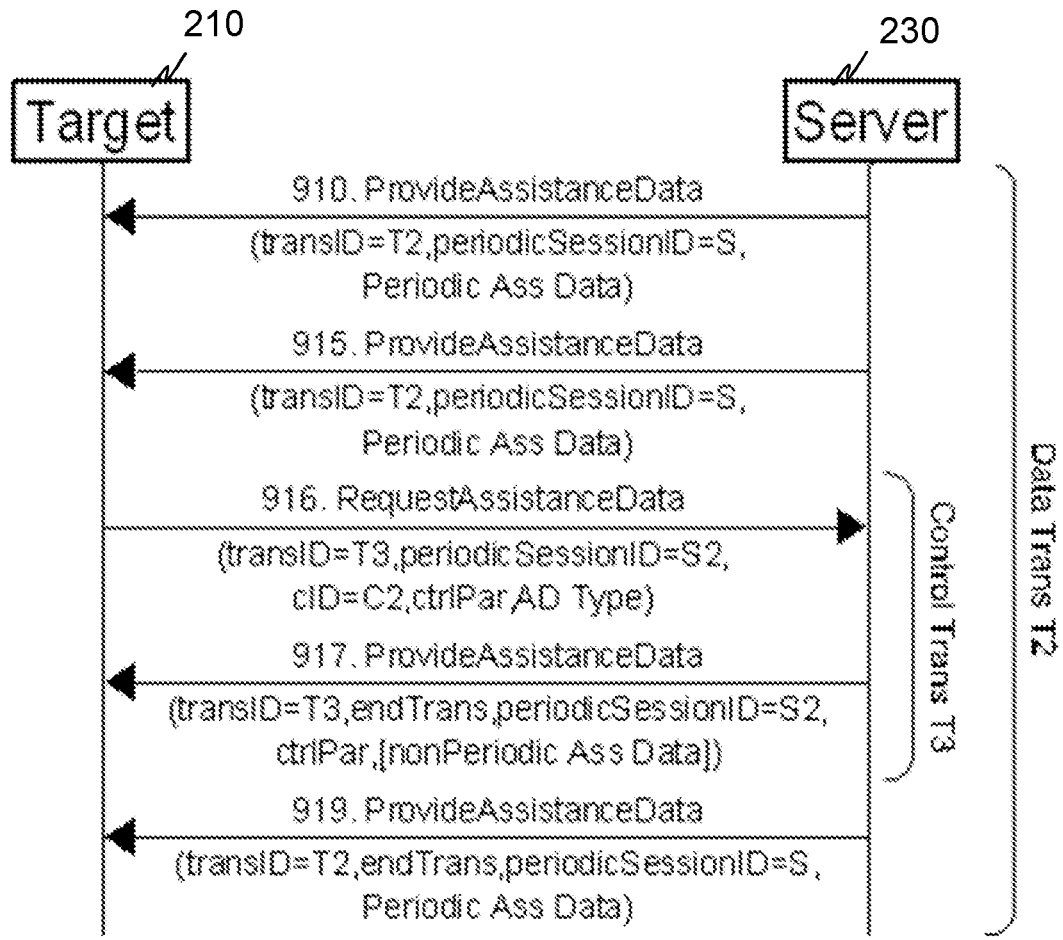
Figure 10C:
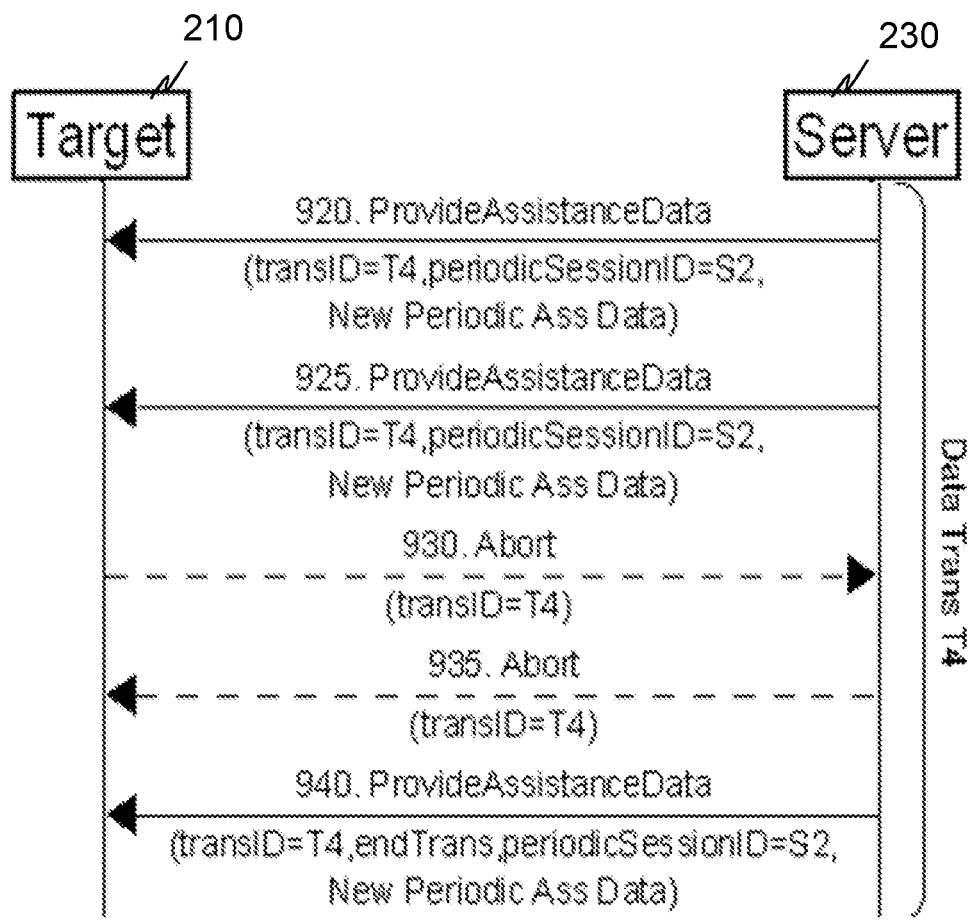

All of these are started in the same way in actions 600, 605, 610 and 615 (which are the same first four signals in FIGS. 8, 9 and 10 and also in the legacy signaling flow in FIG. 6). In action 600,700, 800, 900, the target device 210 initiates the periodic positioning assistance data with a request assistance data message comprising a first transaction ID, a first periodic session ID, a logical position information and some further information (e.g. other control parameters, requested assistance data types, etc). This relates to Actions 301 and 401 described above. In response, the location server 230 sends a provide assistance data message and ends the transaction (605,705,805,905). Then, the location server 230 initiates periodic provisioning of positioning assistance data associated to a new second transaction ID T2 and the same periodic session ID S, cf. action 610,615; 710,715; 810,815; 910,915. This relates to Actions 304. 305, 306, 403, 404 and 405 described above.

All of these also ends with the same four messages (the abort messages are optional) as in the legacy signaling flow.
Abort and Restart In some embodiments illustrated by FIG. 7, the target device 210 updates the logical position information by sending an Abort message 620 to the server 230, which responds by ending the periodic positioning assistance data with message 630. Then the device 210 will start a new periodic session identical to the legacy signaling flow based on a second session ID S2 with messages 635, 640, 645, 650, 655, 660 and 665 being the same as actions 1-7 of FIG. 6.
Indicate Update and Continue In some embodiment illustrated by FIG. 8, the target device 210 only updates the logical position information by two messages 716 and 717 during the periodic positioning assistance data provisioning. The session ID remains the same and also the transaction ID of the periodic AD provisioning. The two control messages 716 and 717 should be associated to a separate third transaction ID, but it may also be possible to reuse the first transaction ID. The other actions are the same as the legacy signaling flow. Note that since the configuration changes due to the logical position info update are indicated as part of the assistance data, there may be optionally a message associated to the configuration associated to a first logical position information before a message associated to the configuration associated to a second logical position information.

This is the most signaling efficient embodiment and it also is very reasonable since most often the configuration of the periodic positioning assistance data remains the same also after an update of the logical position information as discussed in the section "Periodic Positioning Assistance Data Information" below.
Indicated Update Triggers Server Abort In some embodiments illustrated by FIG. 9, the target 210 updates the logical position information by two messages 816 and 817 during the periodic positioning assistance data provisioning, indicating a second session ID S2 (may be the same as the first session ID). This triggers an abort message 818 and an end transaction message 819 from the location server. Then the server 230 initiates a new periodic assistance data provisioning, associated to the second periodic session ID. These steps 820, 825, 830, 835, and 840 correspond to the last steps of the legacy signaling flow messages 3-7.
Indicated Update Triggers Serve Ends Periodic Data In some embodiments illustrated by FIG. 10, the target updates the logical position information by two messages 916 and 917 during the periodic positioning assistance data provisioning, indicating a second session ID S2 (may be the same as the first session ID). This triggers an end transaction message 919 from the location server 230. Then the server 230 initiates a new periodic assistance data provisioning, associated to the second periodic session ID. These steps 920, 925, 930, 935, and 940 corresponds to the last steps of the legacy signaling flow messages 3-7.
Signaling Among Different Nodes In some embodiments the target device 210 will notify to the first radio network node 220 that it has an ongoing positioning session along with the associated Positioning Session ID.

In some alternate embodiments, the first radio network node 220 will notify change of UE location to Location Server 230 using NRPPa or via NgAP and N2 interface. The information may comprise UE identifier, Positioning Session ID, previous serving cell, new Serving cell id etc.

In some embodiments, the AMF 250 will indicate to the location server 230, e.g. an LMF, that the target device 210 has changed its position from a first logical position associated to a first radio network node 220 and the associated new second logical position associated to a second radio network node 222. The information may comprise UE identifier, Positioning Session ID, previous serving cell, new Serving cell id etc.

The above terminologies are for NR/5G; for LTE, it would be MME 250, ESMLC 230, nodes and LPPa, S1AP interfaces.
Periodic Positioning Assistance Data Information FIG. 11 provides examples of information elements that may be considered for periodic positioning assistance data. For GNSS RTK, the information may be associated to physical of non-physical reference stations, each identified by a reference station ID defined in GNSS-RTK-ReferenceStationInfo. Related observations are provided frequently such as once a second for example via GNSS-RTK-CommonObservationInfo and GNSS-RTK-Observations. These observations are associated to reference station IDs.

When the logical position information is updated, the location server 230 may associate the target device 210 to new, partly the same or the same reference stations compared to before. For example, if the non-physical reference stations are separated by a typical distance of 5 km, and a typical inter-site distance could be 500 m in some deployments, then several radio network nodes will be associated to the same non-physical (or physical) reference station Therefore, it is quite likely that an update of the logical position information may happen relatively frequently, but still will not cause any changes in the configuration of the periodic assistance data. Note that the observations will change for every provide assistance data message, but the set of reference stations that the observations are associated to is typical the same.

Therefore, it is reasonable not to change the periodic session unnecessarily often. Therefore, the signaling flow captured by FIG. 8 is a preferred embodiment.

The same conclusion about seldom changes to the configuration of the periodic positioning assistance data is also true for MAC (master and auxiliary encoding of data, a more efficient encoding), FKP (some interpolation parameters provided), direct error estimates provided (real-time PPP where the satellite errors are estimated), atmospheric models provided. All these are also considered to be the same over an area, and an update of the logical position information will typically not change the configuration of these either.

Some example Embodiments numbered 1-7 are described below.

The following embodiments refer among other things to FIGS. 2A, 2B, 3A, 3B, 4A and 4B.

Embodiment 1. A method performed by a target device (210) to e.g. obtain positioning assistance data from a location server (230), wherein the target device (210) and the location server (230) are operating in a wireless communications network (200), and wherein the method comprises:
  transmitting (301), to the location server (230), a request for positioning assistance data and providing first logical position information;
  obtaining (302), from the location server (230), positioning assistance data, e.g. periodic positioning assistance data, based on the first logical position information;
  when being associated with a second logical position, transmitting (303,304), to the location server (230), a request for positioning assistance data and providing second logical position information; and
  obtaining (305,306), from the location server (230), positioning assistance data, e.g. periodic positioning assistance data, based on the second logical position information.

Embodiment 2. The method of Embodiment 1, further comprising:
  using (307) the obtained positioning assistance data. For example, the target device 210 may use the obtained positioning assistance data to determine the position of the target device 210.

Embodiment 3. The method of Embodiment 1 or 2, wherein the positioning assistance data is periodic positioning assistance data obtained at a number of periodic points in time/instants in time in order to obtain updated positioning assistance data.

Embodiment 4. The method of any of Embodiments 1-3, wherein the first logical position information is information about a first logical position corresponding to a first cell (220*a*) served by a first radio network node (220) and the second logical position information is information about a second logical position corresponding to a second cell (222*a*) served by a second radio network node (222).

Embodiment 5. A method performed by a location server (230) to e.g. provide positioning assistance data to a target device (210), wherein the target device (210) and the location server (230) are operating in a wireless communications network (200), and wherein the method comprises:
  obtaining (401), from the target device (210), a request for positioning assistance data and first logical position information;
  providing (402), to the target device (210), positioning assistance data, e.g. periodic positioning assistance data, based on the first logical position information;
  obtaining (403), from the target device (210), a request for positioning assistance data and second logical position information; and
  providing (404,405), to the target device (210), positioning assistance data, e.g. periodic positioning assistance data, based on the second logical position information.

Embodiment 6. The method of Embodiment 5, wherein the positioning assistance data is periodic positioning assistance data provided at a number of periodic points in time/instants in time in order to provide updated positioning assistance data.

Embodiment 7. The method of any of Embodiments 5-6, wherein the first logical position information is information about a first logical position corresponding to a first cell (220*a*) served by a first radio network node (220) and the second logical position information is information about a second logical position corresponding to a second cell (222*a*) served by a second radio network node (222).

FURTHER EXTENSIONS AND VARIATIONS

Figure 12:
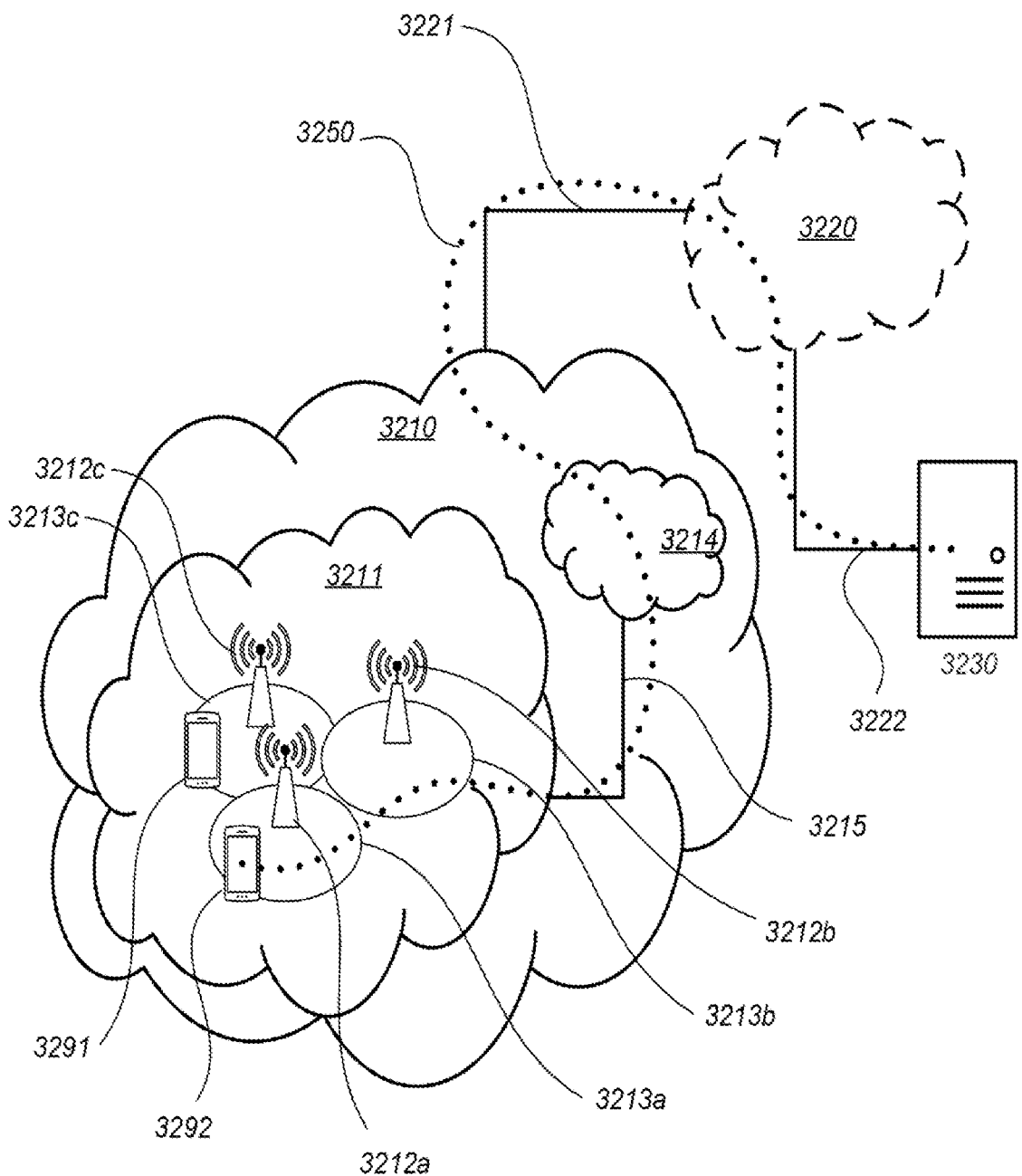
FIG. 12 schematically illustrates a telecommunication network connected via an intermediate network to a host computer.

With reference to FIG. 12, in accordance with an embodiment, a communication system includes a telecommunication network 3210 such as the wireless communications network 200, e.g. a WLAN, such as a 3GPP-type cellular network, which comprises an access network 3211, such as a radio access network, and a core network 3214. The access network 3211 comprises a plurality of base stations 3212*a*, 3212*b*, 3212*c*, such as network nodes 220,222, access nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) e.g. the UE 210 such as a Non-AP STA 3291 located in coverage area 3213*c* is configured to wirelessly connect to, or be paged by, the corresponding base station 3212*c*. A second UE 3292 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 13:
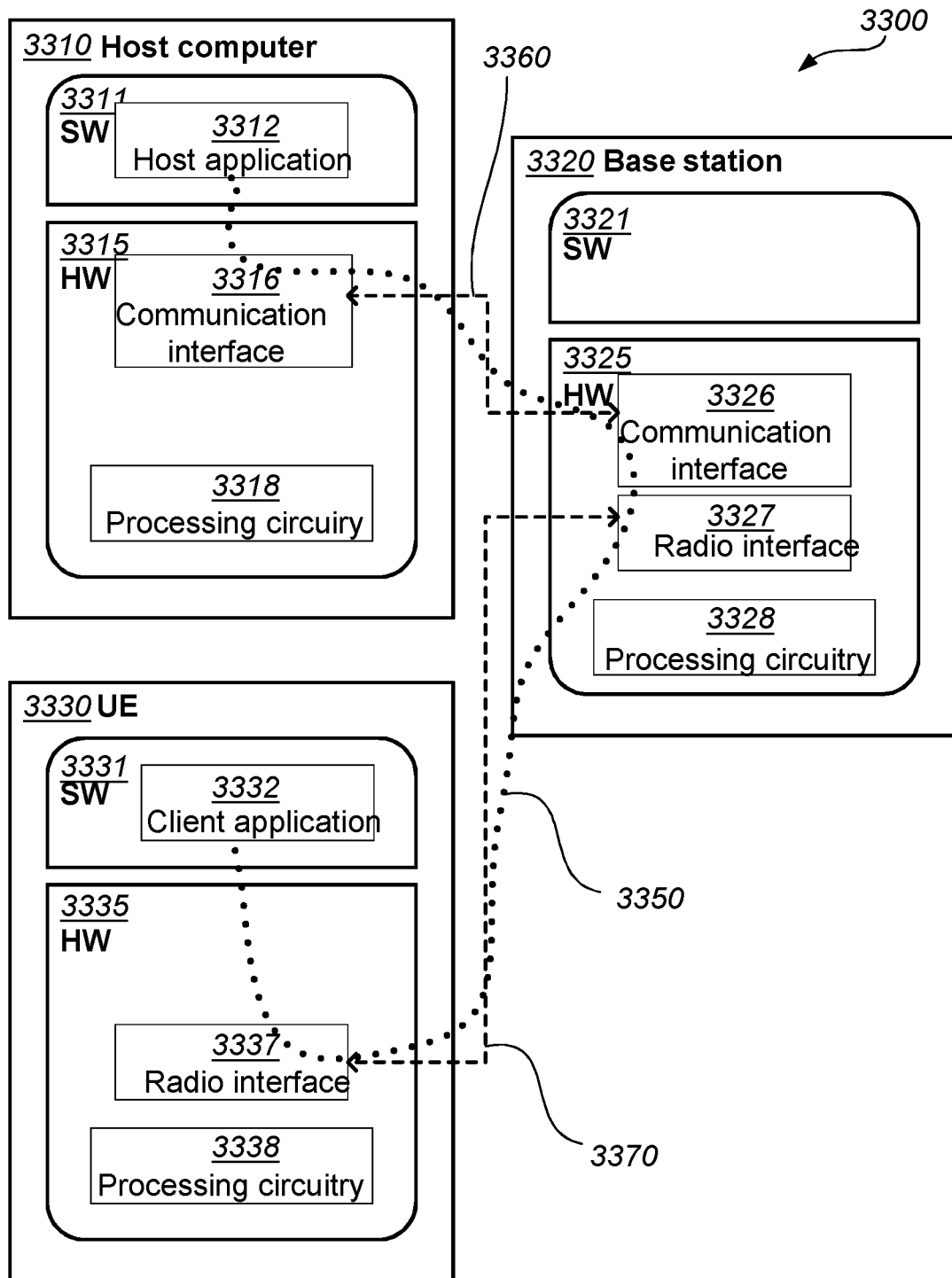
FIG. 13 is a generalized block diagram of a host computer communicating via a base station with a user equipment over a partially wireless connection.

It is noted that the host computer 3310, base station 3320 and UE 3330 illustrated in FIG. 13 may be identical to the host computer 3230, one of the base stations 3212a, 3212b, 3212c and one of the UEs 3291, 3292 of FIG. 12, respectively. This is to say, the inner workings of these entities may be as shown in FIG. 13 and independently, the surrounding network topology may be that of FIG. 12.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the pSIM scheduling allowing more positioning assistance data to be broadcasted.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIGS. 12 and 13 and the corresponding text are about a downstream aspect of the radio-related invention, while FIGS. 14 and 15 and the corresponding text discuss an upstream aspect.

FIG. 14 is a flowchart illustrating a method implemented in a communication system, in accordance with one embodiment. The communication system includes a host computer, a base station such as a AP STA, and a UE such as a Non-AP STA which may be those described with reference to FIGS. 12 and 3. For simplicity of the present disclosure, only drawing references to FIG. 12 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 15 is a flowchart illustrating a method implemented in a communication system, in accordance with one embodiment. The communication system includes a host computer, a base station such as a AP STA, and a UE such as a Non-AP STA which may be those described with reference to FIGS. 12 and 13. For simplicity of the present disclosure, only drawing references to FIG. 15 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 16 is a flowchart illustrating a method implemented in a communication system, in accordance with one embodiment. The communication system includes a host computer, a base station such as a AP STA, and a UE such as a Non-AP STA which may be those described with reference to FIGS. 12 and 13. For simplicity of the present disclosure, only drawing references to FIG. 16 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station such as a AP STA, and a UE such as a Non-AP STA which may be those described with reference to FIGS. 12 and 13. For simplicity of the present disclosure, only drawing references to FIG. 17 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| Abbreviation | Explanation |
| --- | --- |
| A-GNSS | Assisted-GNSS |
| DGNSS | Differential GNSS |
| GNSS | Global Navigation Satellite System |
| OTDOA | Observed Time Difference of Arrival |
| RTK | Real Time Kinematics |
| PPP | Precise Point Positioning |

The invention claimed is:

1. A method performed by a target device to obtain positioning assistance data from a location server, the target device and the location server operating in a wireless communications network, and the method comprising:

transmitting, to the location server, a request for positioning assistance data and providing first logical position information, the request comprising a desired periodicity condition for sending the positioning assistance data and a duration for ending transfer of the positioning assistance data, the request for positioning assistance data comprising a request for non-periodic assistance data, obtaining, from the location server, an error reason when the request for positioning assistance data cannot be one of fully or partly supported, obtaining, from the location server, positioning assistance data including the non-periodic assistance data, based on the first logical position information, when some or all of the positioning assistance data is unavailable, obtaining an error indication in a positioning method specific information element, when being associated with a second logical position, transmitting, to the location server, a request for positioning assistance data and providing second logical position information; and obtaining, from the location server, positioning assistance data, based on the second logical position information, the positioning assistance data being periodic positioning assistance data obtained at a number of periodic points in time in order to obtain updated positioning assistance data, and the periodic positioning assistance data obtained at regular points in time or time instants;

the first and second logical position information each referring to a respective identifier of a respective network entity associated with the target device, and each respective identifier being any one out of:
a base station Identity, ID,
an evolved NodeB, eNB, ID,
a gNB ID,
a Transmission and Reception Point, TRP, ID,
a Transmission Point, TP, ID,
a Reception Point, RP, ID,
a Remote Radio Head, RRH, ID, and
a tracking area code.

2. The method of claim 1, further comprising:
using the obtained positioning assistance data to determine the position of the target device.

3. A non-transitory, computer-readable medium storing computer-executable instructions that, when executed by a processor, causes the processor to:

transmit, to a location server, a request for positioning assistance data and provide first logical position information, the request comprising a desired periodicity condition for sending the positioning assistance data and a duration for ending transfer of the positioning assistance data, the request for positioning assistance data comprising a request for non-periodic assistance data, obtain, from the location server, an error reason when the request for positioning assistance data cannot be one of fully or partly supported, obtain, from the location server, positioning assistance data including the non-periodic assistance data, based on the first logical position information, when some or all of the positioning assistance data is unavailable, obtaining an error indication in a positioning method specific information element, when being associated with a second logical position, transmit, to the location server, a request for positioning assistance data and provide second logical position information; and obtain, from the location server, positioning assistance data, based on the second logical position information, the positioning assistance data being periodic positioning assistance data obtained at a number of periodic points in time in order to obtain updated positioning assistance data, and the periodic positioning assistance data obtained at regular points in time or time instants;

the first and second logical position information each referring to a respective identifier of a respective network entity associated with the target device, and each respective identifier being any one out of:
a base station Identity, ID,
an evolved NodeB, eNB, ID,
a gNB ID,
a Transmission and Reception Point, TRP, ID,
a Transmission Point, TP, ID,
a Reception Point, RP, ID,
a Remote Radio Head, RRH, ID, and
a tracking area code.

4. A method performed by a location server to provide positioning assistance data to a target device, the target device and the location server operating in a wireless communications network, and the method comprising:

obtaining, from the target device, a request for positioning assistance data and first logical position information, the request comprising a desired periodicity condition for sending the positioning assistance data and a duration for ending transfer of the positioning assistance data, the request for positioning assistance data comprising a request for non-periodic assistance data;

providing, to the target device, an error reason when the request for positioning assistance data cannot be one of fully or partly supported, providing, to the target device, positioning assistance data including the non-periodic assistance data, based on the first logical position information, the positioning assistance data being periodic positioning assistance data obtained at a number of periodic points in time in order to obtain updated positioning assistance data, and the periodic positioning assistance data obtained at regular points in time or time instants;

when some or all of the positioning assistance data is unavailable, providing an error indication in a positioning method specific information element, obtaining, from the target device, a request for positioning assistance data and second logical position information; and providing, to the target device, positioning assistance data, based on the second logical position information;

the first and second logical position information each referring to a respective identifier of a respective network entity associated with the target device, and each respective identifier being any one out of:
a base station Identity, ID,
an evolved NodeB, eNB, ID,
a gNB ID,
a Transmission and Reception Point, TRP, ID,
a Transmission Point, TP, ID,
a Reception Point, RP, ID,
a Remote Radio Head, RRH, ID, and
a tracking area code.

5. A non-transitory, computer-readable medium storing computer-executable instructions, which when executed by a processor, causes the processor to:

obtain, from a target device, a request for positioning assistance data and first logical position information, the request comprising a desired periodicity condition for sending the positioning assistance data and a duration for ending transfer of the positioning assistance data, the request for positioning assistance data comprising a request for non-periodic assistance data;

provide, to the target device, an error reason when the request cannot be one of fully or partly supported, provide, to the target device, positioning assistance data including the non-periodic assistance data, based on the first logical position information, the positioning assistance data being periodic positioning assistance data obtained at a number of periodic points in time in order to obtain updated positioning assistance data, and the periodic positioning assistance data obtained at regular points in time or time instants;

when some or all of the positioning assistance data is unavailable, providing an error indication in a positioning method specific information element, obtain, from the target device, a request for positioning assistance data and second logical position information; and provide, to the target device, positioning assistance data, based on the second logical position information;

the first and second logical position information each referring to a respective identifier of a respective network entity associated with the target device, and each respective identifier being any one out of:
   a base station Identity, ID,
   an evolved NodeB, eNB, ID,
   a gNB ID,
   a Transmission and Reception Point, TRP, ID,
   a Transmission Point, TP, ID,
   a Reception Point, RP, ID,
   a Remote Radio Head, RRH, ID, and
   a tracking area code.

6. A target device to obtain positioning assistance data from a location server, the target device and the location server operable in a wireless communications network, and the target device comprising:
   a transmitting unit configured to transmit to the location server, a request for positioning assistance data and providing first logical position information, the request comprising a desired periodicity condition for sending the positioning assistance data and a duration for ending transfer of the positioning assistance data, the request for positioning assistance data comprising a request for non-periodic assistance data,
   an obtaining unit configured to obtain, from the location server, an error reason when the request cannot be one of fully or partly supported, and to obtain from the location server, positioning assistance data including the non-periodic assistance data, based on the first logical position information, the positioning assistance data being periodic positioning assistance data obtained at a number of periodic points in time in order to obtain updated positioning assistance data, and the periodic positioning assistance data obtained at regular points in time or time instants,
   the obtaining unit being configured to, when some or all of the positioning assistance data is unavailable, obtain an error indication in a positioning method specific information element,
   the transmitting unit further configured to, when being associated with a second logical position, transmit to the location server, a request for positioning assistance data and provide second logical position information; and
   the obtaining unit further configured to obtain from the location server, positioning assistance data, based on the second logical position information;
   the first and second logical position information each adapted to refer to a respective identifier of a respective network entity associated with the target device, and
   each respective identifier being adapted to be any one out of:
      a base station Identity, ID,
      an evolved NodeB, eNB, ID,
      a gNB ID,
      a Transmission and Reception Point, TRP, ID,
      a Transmission Point, TP, ID,
      a Reception Point, RP, ID,
      a Remote Radio Head, RRH, ID, and
      a tracking area code.

7. The target device of claim 6, wherein the obtained positioning assistance data is to be used to determine the position of the target device.

8. A location server to provide positioning assistance data to a target device, the target device and the location server operable in a wireless communications network, and the location server comprising:
   an obtaining unit configured to obtain from the target device, a request for positioning assistance data and first logical position information, the request comprising a desired periodicity condition for sending the positioning assistance data and a duration for ending transfer of the positioning assistance data, the request for positioning assistance data comprising a request for non-periodic assistance data;
   a providing unit configured to provide, to the target device, an error reason when the request cannot be one of fully or partly supported, and to provide to the target device, positioning assistance data, including the non-periodic assistance data, based on the first logical position information, the positioning assistance data being periodic positioning assistance data obtained at a number of periodic points in time in order to obtain updated positioning assistance data, and the periodic positioning assistance data obtained at regular points in time or time instants;
   the providing unit configured to, when some or all of the positioning assistance data is unavailable, provide an error indication in a positioning method specific information element;
   the obtaining unit further configured to obtain from the target device, a request for positioning assistance data and second logical position information; and
   the providing unit further configured to provide to the target device, positioning assistance data, based on the second logical position information;
   the first and second logical position information each adapted to refer to a respective identifier of a respective network entity associated with the target device, and
   each respective identifier adapted to be any one out of:
      a base station Identity, ID,
      an evolved NodeB, eNB, ID,
      a gNB ID,
      a Transmission and Reception Point, TRP, ID,
      a Transmission Point, TP, ID,
      a Reception Point, RP, ID,
      a Remote Radio Head, RRH, ID, and
      a tracking area code.

* * * * *